(12) United States Patent
Yokoyama

(10) Patent No.: US 8,260,457 B2
(45) Date of Patent: Sep. 4, 2012

(54) ROBOT, CONTROL METHOD OF ROBOT AND CONTROL PROGRAM OF ROBOT

(75) Inventor: Taro Yokoyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1196 days.

(21) Appl. No.: 12/056,527

(22) Filed: Mar. 27, 2008

(65) Prior Publication Data

US 2008/0240889 A1 Oct. 2, 2008

(30) Foreign Application Priority Data

Mar. 29, 2007 (JP) ................................. 2007-089131

(51) Int. Cl.
*B25J 13/08* (2006.01)
*B25J 5/00* (2006.01)
(52) U.S. Cl. ...... 700/245; 414/800; 901/27; 318/568.12
(58) Field of Classification Search ............. 318/568.17, 318/568.21
See application file for complete search history.

(56) References Cited

U.S. PATENT DOCUMENTS

| | | | | |
|---|---|---|---|---|
| 7,221,120 | B2 * | 5/2007 | Tadano ......................... | 318/567 |
| 7,330,775 | B2 * | 2/2008 | Orita et al. .................... | 700/245 |
| 7,551,978 | B2 * | 6/2009 | Yokoyama et al. ........... | 700/245 |
| 7,822,508 | B2 * | 10/2010 | Sugiyama et al. ............ | 700/245 |
| 2007/0055406 | A1 * | 3/2007 | Tropf ............................. | 700/259 |
| 2007/0239315 | A1 * | 10/2007 | Sato et al. ..................... | 700/245 |
| 2008/0240889 | A1 * | 10/2008 | Yokoyama ....................... | 414/1 |
| 2008/0265821 | A1 * | 10/2008 | Theobald ................. | 318/568.12 |
| 2009/0285664 | A1 * | 11/2009 | Kim et al. ..................... | 414/730 |

FOREIGN PATENT DOCUMENTS

| | | |
|---|---|---|
| EP | 1 449 626 | 8/2004 |
| EP | 1 671 758 | 6/2006 |
| JP | 2003-175481 | 6/2003 |
| JP | 2004-249391 | 9/2004 |
| JP | 2005-088175 | 4/2005 |
| JP | 2005-125462 | 5/2005 |
| JP | 2005-169564 | 6/2006 |
| JP | 2006-159399 | 6/2006 |
| WO | 00/43167 | 7/2000 |
| WO | 2005/015466 | 2/2005 |

* cited by examiner

*Primary Examiner* — Thomas Black
*Assistant Examiner* — Lin B Olsen
(74) *Attorney, Agent, or Firm* — Rankin, Hill & Clark LLP

(57) ABSTRACT

A robot or the like able to precisely grip an object by flexibly changing an operation in accordance with various environments.
When it is judged that a robot is in a "first state", the action of the robot is controlled in accordance with a "first action mode". Thus, the robot does not move and moves an arm or the like on the spot so that a first object $W_1$ can be gripped by a hand. On the other hand, when the judging result is denial, the robot acts in an action mode different from the first action mode so that a relative position or the like of the first object $W_1$ with the robot as a reference is changed. As a result, the robot can be changed from a non-first state to the first state.

36 Claims, 15 Drawing Sheets

FIG.8 (a)
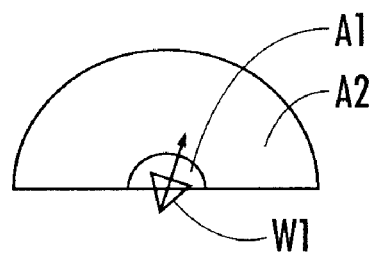
FIG.8 (b)
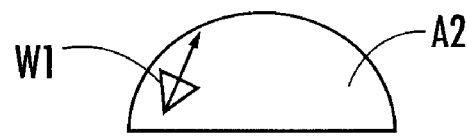
FIG.8 (c)
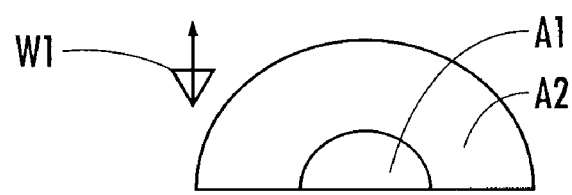
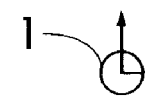

ROBOT, CONTROL METHOD OF ROBOT AND CONTROL PROGRAM OF ROBOT

TECHNICAL FIELD

The present invention relates to a robot or the like having an autonomous moving function and a gripping function of an object using a hand.

BACKGROUND ART

Various techniques for gripping the object by the robot are formerly proposed (see Japanese Patent Laid-Open No. 2005-125462).

However, there is a case in which no hand reaches the object and no object can be precisely gripped for various reasons, such as another object existing around the object as a gripping subject or the like.

Therefore, a purpose of the present invention is to provide a robot or the like able to precisely grip the object by the hand by flexibly changing an operation or an action mode in accordance with various environments.

SUMMARY OF THE INVENTION

The robot of a first invention comprises a base body, an arm extended from the base body, and a hand arranged in a tip portion of the arm, and further comprising a control system for controlling an action of the robot; wherein the control system has a first processing element, a second processing element and a third processing element. The first processing element recognizes a relative position and a relative posture of a first object with the robot as a reference. The second processing element judges whether or not the robot is in a first state wherein the robot is able to act in accordance with a first action mode on the basis of a recognition result of the first processing element. The first action mode is an action mode gripping the first object by the hand according to a first action element of moving at least one of the arm and the hand on the spot without moving the robot. The third processing element controls the action of the robot in accordance with the first action mode subject to a judgment of the second processing element that the robot is in the first state. The third processing element controls the action of the robot in accordance with an action mode different from the first action mode so as to change one or both of the relative position and the relative posture of the first object subject to a judgment of the second processing element that no robot is in the first state.

In accordance with the robot of the first invention, it is judged whether the robot is in the "first state" or not. When the judging result is affirmative, the action of the robot is controlled in accordance with the "first action mode". Thus, the first object can be gripped by the hand according to the "first action element" for moving one or both of the arm and the hand (hereinafter suitably called "the arm or the like") on the spot without moving the robot.

On the other hand, when the judging result is negative, the robot acts in an action mode different from the first action mode so that the robot can be changed from a non-first state to the first state as a result changing one or both of the relative position and the relative posture of the first object (hereinafter suitably called the "relative position or the like of the first object") with the robot as a reference. As mentioned above, the first object can be gripped by the hand by moving the arm or the like by means of the robot.

"Recognizing" information by a constructional element of the present invention means all information processings for preparing the information for further information processing in which the information is read or retrieved through an internal or external network of the robot from an information source such as a memory, a database or the like, and the information is measured, determined, set, estimated, calculated or the like and the information obtained by the retrieval or the like is stored to a memory having a predetermined address, or the like.

In the robot of a second invention in the robot of the first invention, the second processing element further judges whether or not the robot is in a second state wherein the robot is able to act in accordance with a second action mode on the basis of the recognition result of the first processing element; and the second action mode is an action mode for changing the robot from the second state to the first state as a result of changing one or both of the relative position and the relative posture of the first object by the hand according to the first action element; and the third processing element controls the action of the robot in accordance with the second action mode subject to a judgment of the second processing element that the robot is in the second state.

In accordance with the robot of the second invention, it is further judged whether the robot is in the "second state" or not. When the judging result is affirmative, the action of the robot is controlled in accordance with the "second action mode". Thus, the robot can be changed from the second state to the first state as a result of adjusting the relative position or the like of the first object by the hand by moving the arm or the like on the spot by means of the robot. As mentioned above, the first object can be gripped by the hand by moving the arm or the like on the spot by means of the robot.

In the robot of a third invention in the robot of the second invention, the first processing element recognizes a penetration prohibitive area in a situation of that the penetration prohibitive area of the robot exists; the second processing element further judges whether or not the robot is in a third state wherein the robot is able to act in accordance with a third action mode on the basis of the recognition result of the first processing element, and the third action mode is an action mode for changing the robot from the third state to the first state as a result of changing one or both of the relative position and the relative posture of the first object according to a second action element for moving the robot; and the third processing element controls the action of the robot in accordance with the third action mode subject to a judgment of the second processing element that the robot is in the third state.

In accordance with the robot of the third invention, it is further judged whether the robot is in the "third state" or not. When the judging result is affirmative, the action of the robot is controlled in accordance with the "third action mode". Thus, as a result of adjusting the relative position or the like of the first object by the "second action element" for moving the robot, the robot can be changed from the third state to the first state. As mentioned above, the first object can be then gripped by the hand by moving the arm or the like on the spot by means of the robot.

In the robot of a fourth invention in the robot of the third invention, the second processing element further judges whether or not the robot is in a fourth state wherein the robot is able to act in accordance with a fourth action mode on the basis of the recognition result of the first processing element; and the fourth action mode is an action mode for changing the robot from the fourth state to the second state as a result of changing one or both of the relative position and the relative posture of the first object according to the second action element; and the third processing element controls the action of the robot in accordance with the fourth action mode subject to a judgment of the second processing element that the robot is in the fourth state.

In accordance with the robot of the fourth invention, it is further judged whether the robot is in the "fourth state" or not. When the judging result is affirmative, the action of the robot is controlled in accordance with the "fourth action mode". Thus, the robot can be changed from the fourth state to the second state as a result in which the relative position or the like of the first object is adjusted by moving the robot while the robot avoids intrusion into the penetration prohibitive area. Thus, as mentioned above, the robot can be changed from the second state to the first state as a result of adjusting the relative position or the like of the first object by the hand by moving the arm or the like on the spot by means of the robot. The first object can be then gripped by the hand by moving the arm or the like on the spot by means of the robot.

In the robot of a fifth invention in the robot of the fourth invention, the second processing element further judges whether or not the robot is in a fifth state wherein the robot is able to act in accordance with a fifth action mode on the basis of the recognition result of the first processing element; and the fifth action mode is an action mode for changing the robot from the fifth state to the third or fourth state as a result of changing one or both of the relative position and the relative posture of the first object according to the second action element and the first action element subsequent to the second action element; and the third processing element controls the action of the robot in accordance with the fifth action mode subject to a judgment of the second processing element that the robot is in the fifth state.

In accordance with the robot of the fifth invention, it is further judged whether the robot is in the "fifth state" or not. When the judging result is affirmative, the action of the robot is controlled in accordance with the "fifth action mode". Thus, the robot moves and adjusts the relative position or the like of the first object by the hand by moving the arm or the like in a position after the movement. As a result, the robot can be changed from the fifth state to the third state or the fourth state. As mentioned above, as a result of adjusting the relative position or the like of the first object by moving the robot, the robot can be changed from the third state to the first state, or can be changed from the fourth state to the second state, and can be further changed from the second state to the first state. The first object can be then gripped by the hand by moving the arm or the like on the spot by means of the robot.

In the robot of a sixth invention in the robot of the fifth invention, the second processing element judges whether or not the robot is in a state wherein the robot is unable to be changed to one of the first, second, third, fourth and fifth states on the basis of the recognition result of the first processing element; and the third processing element inhibits the action of the robot according to the first, second, third, fourth and fifth action modes subject to a judgment of the second processing element that the robot is in the state.

In accordance with the robot of the sixth invention, when it is very difficult for the robot to grip the first object, the action for gripping the first object can be stopped.

In the robot of a seventh invention in the robot of the first invention, the second processing element judges whether or not the robot is in the first state by judging whether or not the first object is included in a first operation area on the basis of the recognition result of the first processing element; and the first operation area is an area in which its shape and width are changed in accordance with the relative posture of the first object, and the robot can grip the first object by the hand according to the first action element when the first object exists in the first operation area.

In accordance with the robot of the seventh invention, it can be judged whether the robot is in the first state or not by judging whether the first object exists in the first operation area or not. It is also possible to judge whether or not the relative posture of the first object is suitable as well as its relative position from a viewpoint in which the robot grips the first object by the hand on the spot by using the first operation area in which the shape and width are changed in accordance with the relative posture of the first object. When it is judged that the robot is in the first state, the robot moves the arm or the like on the spot so that the first object existing in the first operation area can be gripped.

In the robot of an eighth invention in the robot of the seventh invention, the first processing element further recognizes a relative position and a relative posture of a second object with the robot as a reference in a situation in which the first object is placed on the second object, and in which a direction able to make the hand approach the first object is limited by a specific portion of the second object; and the second processing element recognizes an operation shade area constituting a shade of the specific portion of the second object seen from the robot on the basis of the recognition result of the first processing element, and judges whether or not the robot is in the first state on the basis of the first operation area with an overlapping area with the operation shade area removed therefrom.

In accordance with the robot of the eighth invention, when an overlapping area with the operation shade area (=an area constituting a shade of a specific portion of the second object seen from the robot) exists in the first operation area, it is judged whether or not the robot is in the first state on the basis of the first operation area in which the overlapping area is deleted and corrected. Thus, when the robot moves the arm or the like to grip the first object on the spot in accordance with the first action mode, it is avoided that the arm or the like comes in contact with the specific portion of the second object.

In the robot of a ninth invention in the robot of the second invention, the second processing element judges whether or not the robot is in the second state by judging whether or not the first object is included in a second operation area on the basis of the recognition result of the first processing element. The second operation area is an area in which its shape and width are changed in accordance with the relative posture of the first object, and the robot can move the first object from the second operation area to the first operation area as a result of changing one or both of the relative position and the relative posture of the first object by the hand according to the first action element since the first object exists in the second operation area. The first operation area is an area in which its shape and width are changed in accordance with the relative posture of the first object, and the robot can grip the first object by the hand according to the first action element when the first object exists in the first operation area.

In accordance with the robot of the ninth invention, it can be judged whether the robot is in the second state or not by judging whether the first object is included in the second operation area or not. It can be also judged whether the relative posture of the first object is suitable or not as well as the relative position thereof from a viewpoint in which the robot changes the relative position or the like of the first object by the hand on the spot by using the second operation area changed in shape and width in accordance with the relative posture of the first object. When it is judged that the robot is in the second state, the robot moves the arm or the like so that the relative position or the like of the first object existing in the second operation area can be changed. As its result, the first object is moved to the first operation area, and the robot moves the arm or the like on the spot as mentioned above so that the first object can be gripped.

In the robot of a tenth invention in the robot of the ninth invention, the first processing element further recognizes a relative position and a relative posture of the second object with the robot as a reference in a situation in which the first object is placed on a second object, and a direction able to make the hand approach the first object is limited by a specific portion of the second object; and the second processing element recognizes an operation shade area constituting a shade of the specific portion of the second object seen from the robot on the basis of the recognition result of the first processing element, and judges whether or not the robot is in the second state on the basis of the first and second operation areas with an overlapping area with the operation shade area removed therefrom.

In accordance with the robot of the tenth invention, when an overlapping area with the operation shade area (=an area constituting a shade of a specific portion of the second object seen from the robot) exists in the second operation area, it is judged whether or not the robot is in the second state on the basis of the second operation area in which the overlapping area is deleted and corrected. Thus, when the robot moves the arm or the like to change the relative position or the like of the first object on the spot in accordance with the second action mode, it is avoided that the arm or the like comes in contact with the specific portion of the second object.

In the robot of an eleventh invention in the robot of the third invention, the second processing element selects the action mode in view of saving of one or both of time and energy required to change the robot to the first state among the second and third action modes when it is judged that the robot is in both the second and third states; and the third processing element controls the action of the robot in accordance with an action plan selected by the second processing element among the second and third action modes.

In accordance with the robot of the eleventh invention, when the robot is in both the second and third states, the robot can act in accordance with an action mode preferable from the viewpoint of saving of time and energy required to change the robot to the first state among the second and third action modes.

In the robot of a twelfth invention in the robot of the eleventh invention, the action of the robot is controlled in accordance with the third action mode subject to a judgment of the second processing element that the robot is not in the second state and is in the third state.

In accordance with the robot of the twelfth invention, when there is no room of selection of the above second and third action modes, the action of the robot can be controlled in accordance with the third action mode.

In the robot of a thirteenth invention in the robot of the third invention, the first processing element recognizes an area surrounding the second object as the penetration prohibitive area in a situation in which the first object is placed on the second object.

In accordance with the robot of the thirteenth invention, the robot can be changed from the third state to the first state by moving the robot while avoiding contact with the second object.

In the robot of a fourteenth invention in the robot of the third invention, the second processing element judges whether or not the robot is in the third state by judging whether or not a first advancement condition is satisfied on the basis of the recognition result of the first processing element. The first advancement condition is a condition in which at least one portion of a first reference area is projected out of the penetration prohibitive area. The first reference area is an area in which the robot can grip the first object by the hand according to the first action element when the robot exists in the first reference area.

In accordance with the robot of the fourteenth invention, while it is avoided that the robot advances to the penetration prohibitive area, it is judged whether or not the robot is in the third state from the viewpoint of whether or not the robot can move to an area able to grip the first object by the hand on the spot. Thus, when it is judged that the robot is in the third state, while it is avoided that the robot advances into the penetration prohibitive area, the robot can move to an area (=a portion projected out of the penetration prohibitive area among the first reference area) able to grip the first object by the hand on the spot.

In the robot of a fifteenth invention in the robot of the fourteenth invention, the first processing element further recognizes a relative position and a relative posture of a second object with the robot as a reference in a situation in which the first object is placed on the second object, and a direction able to make the hand approach the first object is limited by a specific portion of the second object; and the second processing element recognizes a reference shade area constituting a shade of the specific portion of the second object seen from the first object on the basis of the recognition result of the first processing element, and judges whether or not the first advancement condition is satisfied on the basis of the first reference area with an overlapping area with the reference shade area removed therefrom.

In accordance with the robot of the fifteenth invention, when an overlapping area with the reference shade area (=an area constituting a shade of a specific portion of the second object seen from the first object) exists in the first reference area, it is judged whether or not the robot is in the third state on the basis of the first reference area in which the overlapping area is deleted and corrected. Thus, it is avoided that it becomes a situation in which the specific portion of the second object becomes an obstacle and no first object can be gripped although the robot changes the position or the like of the base body in accordance with the third action mode.

In the robot of a sixteenth invention in the robot of the fourth invention, the second processing element judges whether or not the robot is in the fourth state by judging whether or not a second advancement condition is satisfied on the basis of the recognition result of the first processing element. The second advancement condition is a condition in which the entire first reference area is included in the penetration prohibitive area, and at least one portion of the second reference area is projected out of the penetration prohibitive area. The first reference area is an area in which the robot can grip the first object by the hand according to the first action element when the robot exists in the first reference area. The second reference area is an area able to change the robot from the second state to the first state as a result in which the robot changes one or both of the relative position and the relative posture of the first object by the hand according to the first action element when the robot exists in the second reference area.

In accordance with the robot of the sixteenth invention, while it is avoided that the robot advances into the penetration prohibitive area, it is judged whether or not the robot is in the fourth state from the viewpoint of whether or not the robot can move to an area able to change the relative position or the like of the first object by the hand on the spot. Thus, when it is judged that the robot is in the fourth state, while it is avoided that the robot advances into the penetration prohibitive area, the robot can move to an area (=a portion projected out of the penetration prohibitive area among the second reference area) able to change the relative position or the like of the first object by the hand on the spot.

In the robot of a seventeenth invention in the robot of the sixteenth invention, the first processing element further recognizes a relative position and a relative posture of a second object with the robot as a reference in a situation in which the first object is placed on the second object, and a direction able to make the hand approach the first object is limited by a specific portion of the second object; and the second processing element recognizes a reference shade area constituting a shade of the specific portion of the second object seen from the first object on the basis of the recognition result of the first processing element, and judges whether or not the second advancement condition is satisfied on the basis of the first and second reference areas with an overlapping area with the reference shade area removed therefrom.

In accordance with the robot of the seventeenth invention, when an overlapping area with the reference shade area (=an area constituting a shade of the specific portion of the second object seen from the first object) exists in one or both of the first and second reference areas, it is judged whether or not the robot is in the fourth state on the basis of the first and second reference areas in which the overlapping area is deleted and corrected. Thus, it is avoided that it becomes a situation in which the specific portion of the second object becomes an obstacle and the relative position or the like of the first object cannot be changed by the hand on the spot although the robot moves in accordance with the fourth action mode.

In the robot of an eighteenth invention in the robot of the fifth invention, the second processing element judges whether or not the robot is in the fifth state by judging whether or not a third advancement condition is satisfied. The third advancement condition is a condition in which all portions of the first and second reference areas are included in the penetration prohibitive area, and at least one portion of the third reference area is projected out of the penetration prohibitive area. The first reference area is an area in which the robot can grip the first object by the hand according to the first action element when the robot exists in the first reference area. The second reference area is an area able to change the robot from the second state to the first state as a result in which the robot changes one or both of the relative position and the relative posture of the first object by the hand according to the first action element when the robot exists in the second reference area. The third reference area is an area able to change the robot from the fifth state to the third state or the fourth state as a result in which the robot changes one or both of the relative position and the relative posture of the first object by the hand according to the first action element when the robot exists in the third reference area.

In accordance with the robot of the eighteenth invention, while it is avoided that the robot advances into the penetration prohibitive area, it is judged whether or not the robot is in the fifth state from the viewpoint of whether or not the robot can move to an area for realizing the third or fourth state by changing the relative position or the like of the first object by the hand on the spot. Thus, when it is judged that the robot is in the fifth state, while it is avoided that the robot advances into the penetration prohibitive area, the robot can move to an area (=a portion projected out of the penetration prohibitive area among the third reference area) able to change the relative position or the like of the first object by the hand on the spot.

In the robot of a nineteenth invention in the robot of the eighteenth invention, the first processing element further recognizes a relative position and a relative posture of a second object with the robot as a reference in a situation in which the first object is placed on the second object, and a direction able to make the hand approach the first object is limited by a specific portion of the second object; and the third processing element recognizes a reference shade area constituting a shade of the specific portion of the second object seen from the first object on the basis of the recognition result of the first processing element, and judges whether or not the third advancement condition is satisfied on the basis of the first, second and third reference areas with an overlapping area with the reference shade area removed therefrom.

In accordance with the robot of the nineteenth invention, when an overlapping area with the reference shade area (=an area constituting a shade of the specific portion of the second object seen from the first object) exists in one portion or all portions of the first, second and third reference areas, it is judged whether or not the robot is in the fifth state on the basis of the three reference areas in which the overlapping area is deleted and corrected. Thus, it is avoided that it becomes a situation in which the specific portion of the second object becomes an obstacle and the relative position or the like of the first object cannot be changed by the hand to realize the third or fourth state although the robot moves in accordance with the fifth action mode.

In the robot of a twentieth invention in the robot of the sixth invention, the third processing element externally notifies that the robot is in the state when it is judged that the robot is in the above state.

In accordance with the robot of the twentieth invention, it is notified to a human being in the surroundings that the robot is in the state and it is very difficult to act so as to finally grip the first object. Thus, it is possible for the human being to take a coping measure such as changes of the position and posture of the first object or the like.

In the robot of a twenty-first invention in the robot of the first invention, the first processing element further recognizes a first difficult direction in which mobility of the first object is less than a threshold value in a situation in which there is a propensity for the mobility of the first object; and the second processing element judges whether or not the robot is in the first state on the basis of the first action mode in which force in the first difficult direction is applied from the hand to the first object in gripping the first object on the basis of the recognition result of the first processing element.

In accordance with the robot of the twenty-first invention, when the robot is in the first state, the first object can be gripped while force in the first difficult direction is applied to the first object by the hand. Therefore, when the robot acts in accordance with the first action mode to grip the first object, a situation in which the position and posture of the first object are greatly changed to a degree unable to grip the first object on the spot by means of the robot is avoided.

In the robot of a twenty-second invention in the robot of the first invention, the first processing element further recognizes a second difficult direction in which mobility of the second object is less than a threshold value in a situation in which the first object is placed on the second object and there is a propensity for the mobility of the second object; and the second processing element judges whether or not the robot is in the first state on the basis of the first action mode in which force in the second difficult direction is applied from the hand to the first object in gripping the first object on the basis of the recognition result of the first processing element.

In accordance with the robot of the twenty-second invention, when the robot is in the first state, the first object can be gripped while force in the second difficult direction is applied to the first object by the hand. Therefore, when the robot acts in accordance with the first action mode to grip the first object, a situation in which the position and posture of the first object are greatly changed to a degree unable to grip the first object on the spot by means of the robot by changing the position and posture of the second object is avoided.

In the robot of a twenty-third invention in the robot of the second invention, the first processing element further recognizes a first easy direction in which mobility of the first object is a threshold value or more in a situation in which there is a propensity for the mobility of the first object; and the second processing element judges whether or not the robot is in the second state on the basis of the second action mode in which force in the first easy direction is applied from the hand to the first object when one or both of the relative position and the relative posture of the first object are changed by the hand by operating the arm and the hand on the basis of the recognition result of the first processing element.

In accordance with the robot of the twenty-third invention, when the robot is in the second state, the position and posture of the first object can be adjusted while force in the first easy direction is applied to the first object by the hand. Therefore, the robot acts in accordance with the second action mode so that the position and posture of the first object can be easily adjusted.

In the robot of a twenty-fourth invention in the robot of the second invention, the first processing element further recognizes a second easy direction in which mobility of the second object is a threshold value or more in a situation in which there is a propensity for the mobility of the second object; and the second processing element judges whether or not the robot is in the second state on the basis of the second action mode in which force in the second easy direction is applied from the hand to the first object when one or both of the relative position and the relative posture of the first object are changed by the hand by operating the arm and the hand on the basis of the recognition result of the first processing element.

In accordance with the robot of the twenty-fourth invention, when the robot is in the second state, the position and posture of the first object can be adjusted while force in the second easy direction is applied to the first object by the hand. Therefore, the position and posture of the first object can be easily adjusted as a result in which the robot acts in accordance with the second action mode so that the position and posture of the second object are changed.

In the robot of a twenty-fifth invention in the robot of the first invention, the first processing element judges whether the gripping of the first object is successful or not; and the third processing element stops the operation of the robot subject to a judgment of the first processing element that the gripping of the first object is unsuccessful.

In accordance with the robot of the twenty-fifth invention, when the gripping of the first object is unsuccessful, the operation of the robot is stopped. Thus, for example, it is possible to await a situation change able to grip the first object by the robot. Further, it is possible to avoid a situation in which energy such as electric power or the like for moving the robot to grip the first object is uselessly consumed.

The robot of a twenty-sixth invention in the robot of the first invention is a legged mobile robot having a plurality of legs extended from the base body.

In accordance with the robot of the twenty-sixth invention, one or both of the position and posture of the robot can be changed in accordance with the third to fifth action modes by moving a plurality of legs extended from the base body.

A method of each of twenty-seventh to thirty-first inventions is a method for controlling the action of a robot comprising a base body, an arm extended from the base body, and a hand arranged in a tip portion of the arm. First to third processings for controlling the action of the robot, executed by the control system arranged in the robot of each of the first to fifth inventions are executed.

In accordance with this method, when the robot does not move and moves the arm or the like on the spot so that no first object can be gripped by the hand, the robot acts in an action mode different from the first action mode. As its result, one or both of the relative position and relative posture of the first object with the robot as a reference are changed. As its result, the robot can be changed from a non-first state to the first state, and the first object can be then gripped by the robot.

A program of each of thirty-second to thirty-sixth inventions is characterized in that a computer mounted to the robot functions as the control system arranged in the robot of each of the first to fifth inventions.

In accordance with this program, when the robot does not move and moves the arm or the like on the spot so that no first object can be gripped by the hand, the robot can act in an action mode different from the first action mode by the function of the computer mounted to the robot. Thus, it is possible to change one or both of the relative position and relative posture of the first object with the robot as a reference. As its result, the robot can be changed from a non-first state to the first state, and the first object can be then gripped by the robot.

BRIEF DESCRIPTION OF THE DRAWINGS

FIG. 8 is a functional explanatory view of the robot of the present invention.

DESCRIPTION OF THE PREFERRED EMBODIMENTS

An embodiment of a robot or the like of the present invention will be explained by using the drawings.

Figure 1:
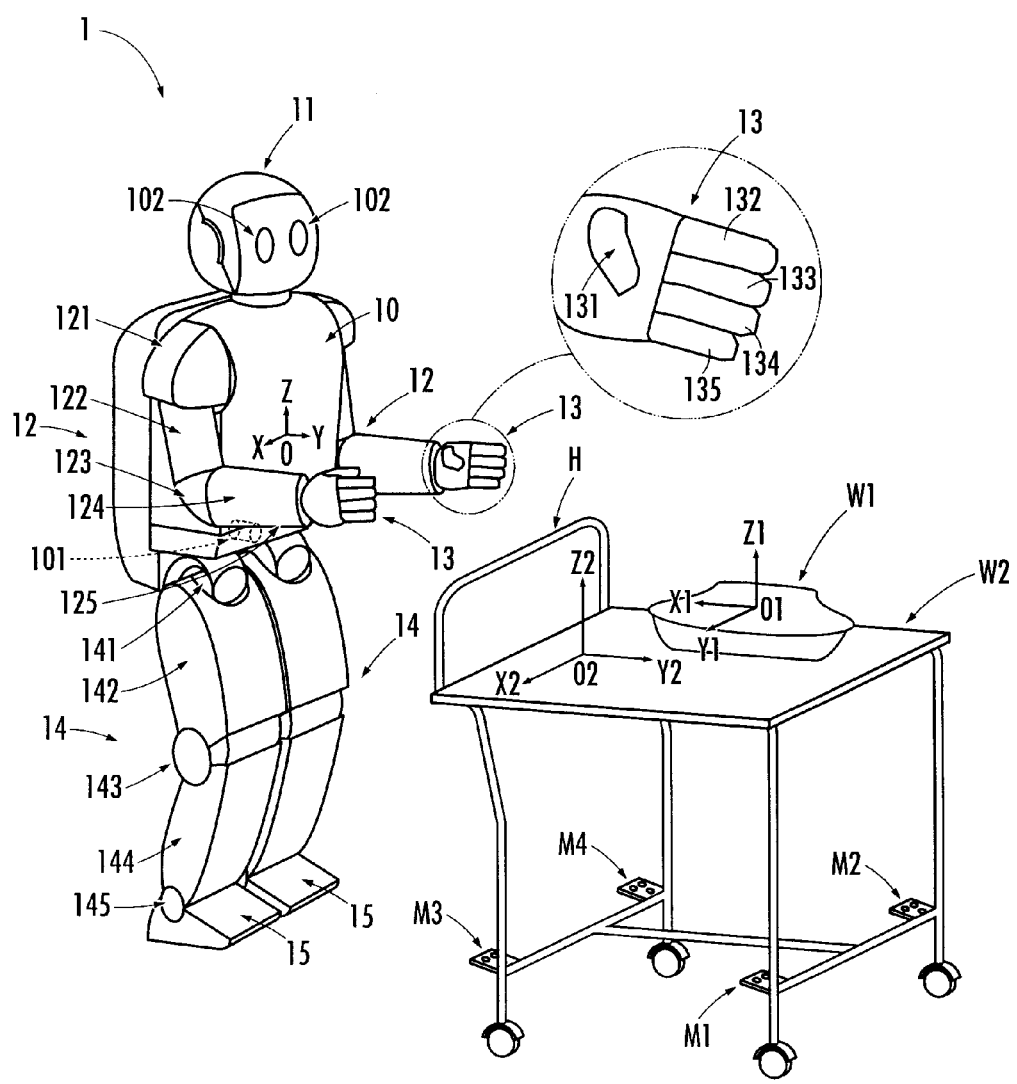
FIG. 1 is a constructional explanatory view of a robot of the present invention.

First, the construction of the robot will be explained. The robot 1 shown in FIG. 1 is a legged mobile robot. Similar to a human being, the robot 1 has a base body 10, a head 11 arranged above the base body 10, left and right arms 12 extended from both upper side portions in an upper portion of the base body 10, a hand 13 arranged at each of tips of the left and right arms 12, left and right legs 14 extended downward from a lower portion of the base body 10, and a foot portion 15 arranged at each of tips of the left and right legs 14. Further, the robot 1 has a control system 20 for controlling its action.

The base body 10 is constructed by the upper portion and the lower portion vertically connected so as to be relatively rotated around a yaw axis. A waist camera 101 having a forward downward direction of the robot 1 as an imaging range is built in the lower portion of the base body 10. The waist camera (active sensor) 101 is used to measure the position or the like of the object by detecting light reflected on the object of near infrared light emitted toward the forward downward direction of the robot 1 from an unillustrated near infrared lamp. A camera able to sense light in various frequency bands such as a CCD camera, an infrared camera or the like may be adopted as the waist camera 101.

The head 11 can move as in rotation around the yaw axis with respect to the base body 10. A pair of left and right head cameras 102 is mounted to the head 11. The imaging range of the head camera 102 can be adjusted by moving the head 11 with respect to the base body or the like. A camera able to sense light in various frequency bands such as a CCD camera, an infrared camera or the like may be adopted as the head camera 102.

The arm 12 has a first arm link 122 and a second arm link 124. The base body 10 and the first arm link 122 are connected through a shoulder joint 121. The first arm link 122 and the second arm link 124 are connected through an elbow joint 123. The second arm link 124 and the hand 13 are connected through a hand root joint 125. The shoulder joint 121 has a degree of freedom of rotation around roll, pitch and yaw axes. The elbow joint 123 has a degree of freedom of rotation around the pitch axis. The hand root joint 125 has a degree of freedom of rotation around the roll, pitch and yaw axes. A six-axis force sensor 106 is arranged near the hand root joint 125.

The leg 14 has a first leg link 142 and a second leg link 144. The base body 10 and the first leg link 142 are connected through a hip joint 141. The first leg link 142 and the second leg link 144 are connected through a knee joint 143. The second leg link 144 and the foot portion 15 are connected through a foot joint 145. The hip joint 141 has a degree of freedom of rotation around roll, pitch and roll axes. The knee joint 143 has a degree of freedom of rotation around the pitch axis. The foot joint 145 has a degree of freedom of rotation around the roll and pitch axes.

The hand 13 has five finger mechanisms 131 to 135 that are extended from a hand palm respectively corresponding to a thumb, an index finger, a middle finger, a medical finger and a little finger of the hand of a human being. The first finger mechanism 131 and the four finger mechanisms 132 to 135 arranged in parallel are oppositely arranged.

The first finger mechanism 131 has three link members corresponding to a first metacarpal bone of the hand of a human being, a proximal phalanx and a distal phalanx of the thumb, and an elastic cover for covering these three link members. The three link members are sequentially connected through joints respectively corresponding to a joint of the base side of the first metacarpal bone of the hand of a human being, and a metacarpal interphalangeal joint and an interphalangeal joint of the thumb from the hand palm. The first finger mechanism 131 can be bent in each joint in accordance with force transmitted through a power transmitting mechanism constructed by a speed reducing mechanism or the like from a motor stored in the hand palm. The power transmitted from the motor to the first finger mechanism 131 is controlled by the control system 20.

The finger mechanisms 132 to 135 are constructed similarly to a finger mechanism described in e.g., Japanese Patent Laid-Open No. 2003-181787, and are respectively approximately similarly constructed. For example, the fifth finger mechanism 135 has three link members respectively corresponding to a proximal phalanx, a middle phalanx and a distal phalanx of the little finger of the hand of a human being, and an elastic cover for covering these three link members. The three link members are sequentially connected through joints respectively corresponding to a metacarpal interphalangeal joint, a proximal interphalangeal joint and a distal interphalangeal joint of the little finger of the hand of a human being from the hand palm. The fifth finger mechanism 135 can be bent inside at each joint in accordance with power transmitted through a power transmitting mechanism from an unillustrated motor as a power source. The power transmitted from the motor to the fifth finger mechanism 135 is controlled by a control system 200 similarly to the first finger mechanism 131.

In the finger mechanisms 131 to 135, a plurality of finger mechanisms may be operated by one common motor, and one finger mechanism may be also operated by one motor as in the first finger mechanism 131 in this embodiment. Further, as described in the above Japanese Patent Laid-Open No. 2003-181787, the power transmitting mechanism may be also constructed by a wire, a pulley or the like, and all constructions able to transmit the power of the motor so as to bend and stretch each finger mechanism may be also adopted.

Figure 2:
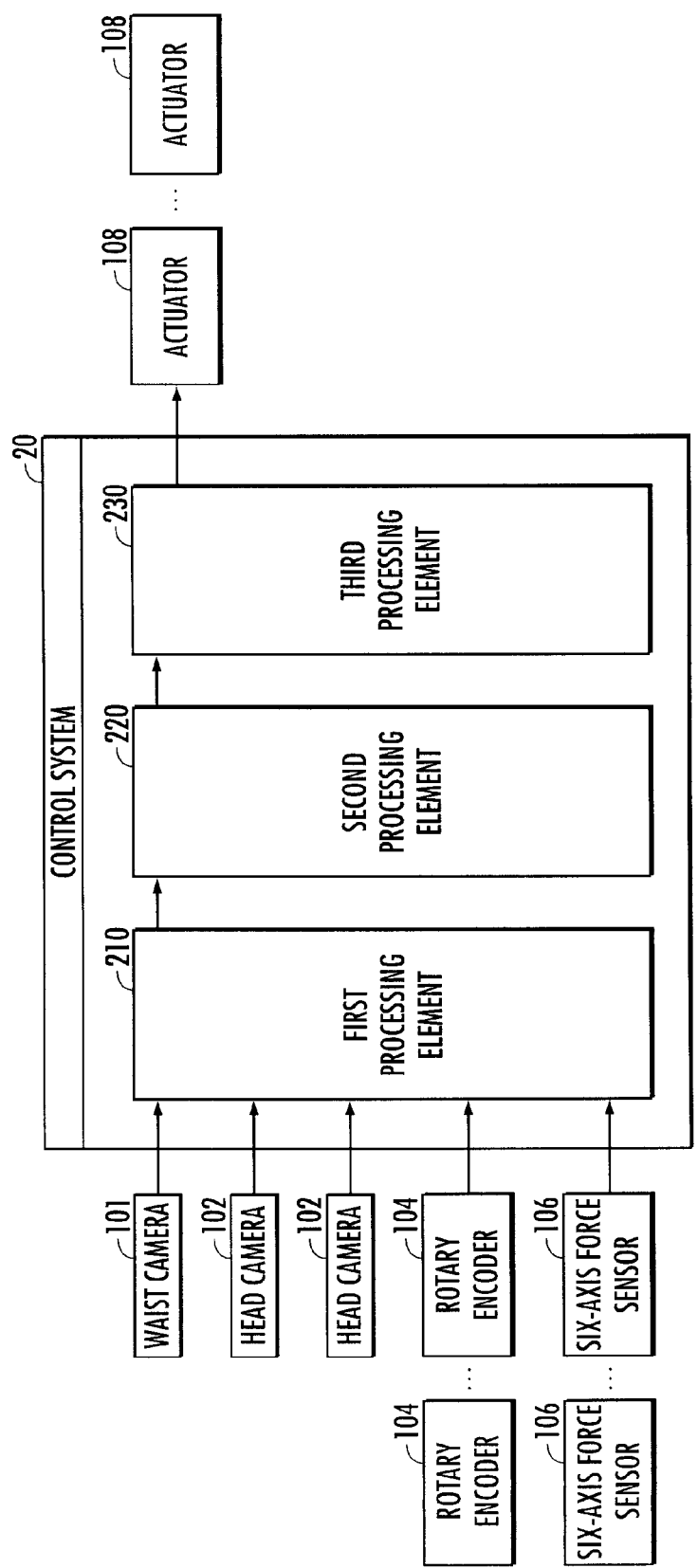
FIG. 2 is a constructional explanatory view of a control system of the robot of the present invention.

The control system 20 shown in FIG. 2 is constructed by a CPU, a ROM, a RAM, an I/O or the like. The control system 20 controls the operation of the robot 1 by controlling the operation of an actuator (or an electric motor) 108 on the basis of an image obtained through each of the head camera 102 and the waist camera 101, an output from a rotary encoder 104 showing each joint angle of the robot 1 in the arm 12, the leg 14 or the like, an output from the six-axis force sensor 106 for detecting force applied to the hand 13 or the like. The control system may be also a distributed control system constructed by a main control unit and one or plural subcontrol units connected through an internal network of the robot 1.

"The control program" for functioning a computer mounted to the robot 1 as the control system 20 may be also stored to a memory in advance. However, the control program may be delivered (downloaded) or broadcasted to the computer from a server through a network and an artificial satellite in arbitrary timing in which there is a request from the robot 1 or the like, and may be also stored to a memory for the program.

The control system 20 has a first processing section 210, a second processing section 220, and a third processing section 230. The first processing section 210, the second processing section 220 and the third processing section 230 may be constructed by the same CPU or processor, and may be also constructed by different CPUs or processors.

The first processing section 210 recognizes respective relative positions and relative postures of a first object $W_1$ and a second object $W_2$ with the robot 1 as a reference. Concretely, the first processing section 210 recognizes the position and posture of the robot 1 (or the base body 10) on the basis of an output of the rotary encoder 104 arranged in joints 121, 123, 125, 141, 143, 145 and the like of the robot 1, the lengths of links 122, 124, 142, 144 and the like. Further, the first processing section 210 recognizes the position, posture and the like of the first object $W_1$ as a gripping object of the robot 1 on the basis of an image signal or the like obtained through the head camera 102 or the waist camera 101. Further, the first processing section 210 recognizes the position, posture and the like of the second object $W_2$ on which the first object $W_1$ is placed, on the basis of an image signal or the like obtained through the head camera 102 or the waist camera 101. The respective positions and the like of the first object $W_1$ and the second object $W_2$ may be also recognized by various sensors such as a millimeter wave radar, an ultrasonic sensor or the like or these combination as a replacing sensor or an adding sensor (auxiliary sensor) of the head camera 102 and the waist camera 101. In addition to this, the respective positions and the like of the first object $W_1$ and the second object $W_2$ in a robot coordinate system may be also recognized by retrieving a database and utilizing GPS.

The second processing section 220 judges whether the robot 1 is in any one of first to fifth states in which the robot 1 can act in accordance with respective first to fifth action modes on the basis of a recognition result provided by the first processing section 210. "The first action mode" is an action mode in which the first object $W_1$ is gripped by the hand 13 by a first action element for moving the arm 12 or the like. "The second action mode" is an action mode in which the robot 1 is changed from the second state to the first state as a result of changing a relative position or the like of the first object $W_1$ by the hand 13 by the first action element. "The third action mode" is an action mode in which the robot 1 is changed from the third state to the first state as a result of changing the relative position or the like of the first object $W_1$ by a second action element for changing the position or the like of the base body 10. "The fourth action mode" is an action mode in which the robot 1 is changed from the fourth state to the second state as a result of changing the relative position or the like of the first object $W_1$ by the second action element. "The fifth action mode" is an action mode in which the robot 1 is changed from the fifth state to the third or fourth state as a result of changing the relative position or the like of the first object $W_1$ by the second action element and the first action element subsequent thereto.

The third processing section 230 controls the action of the robot 1 in accordance with one of the first to fifth action modes on the basis of a judging result of the second processing section 220.

Figure 11:
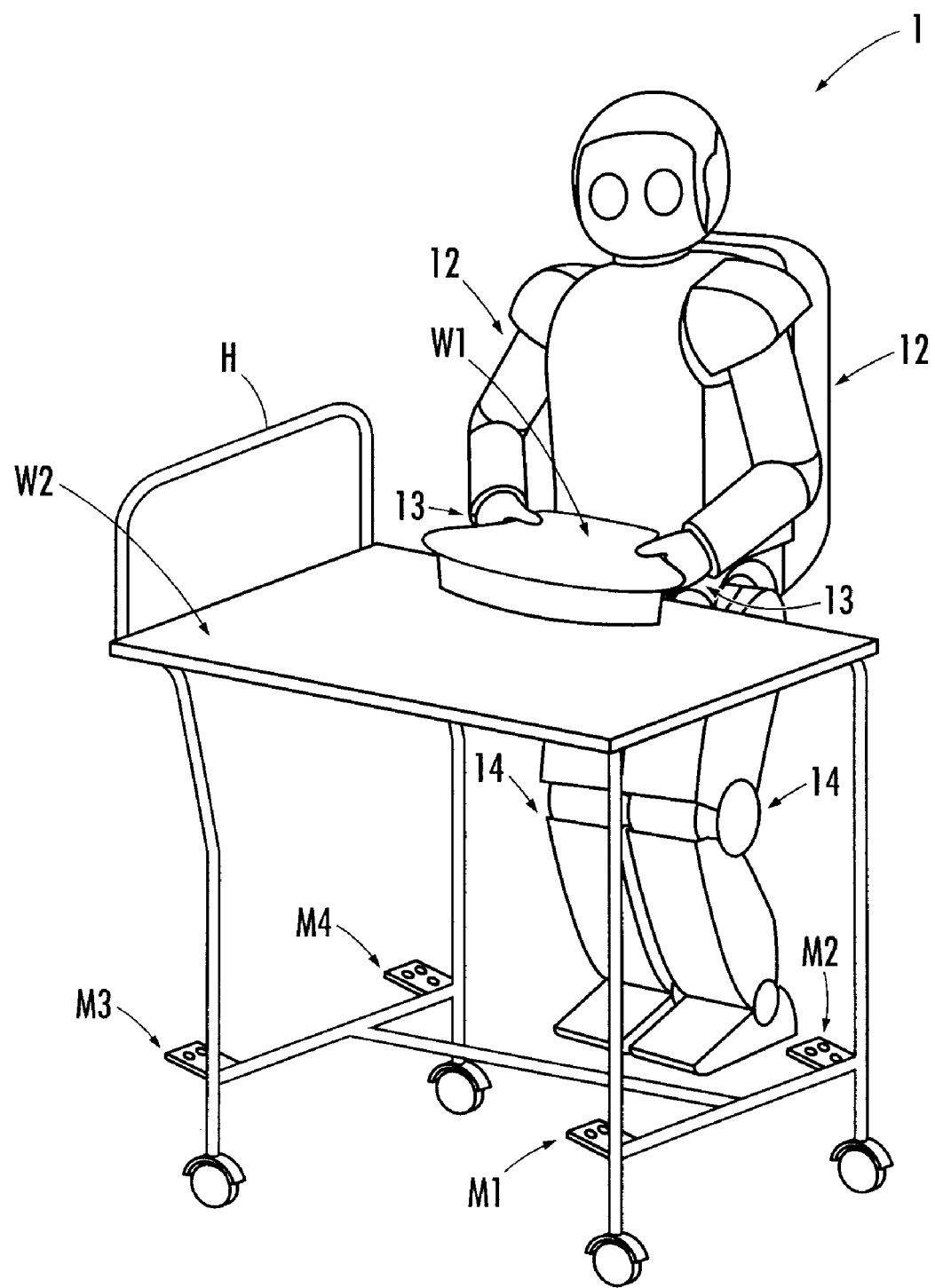
FIG. 11 is a functional explanatory view of the robot of the present invention.
Figure 12:
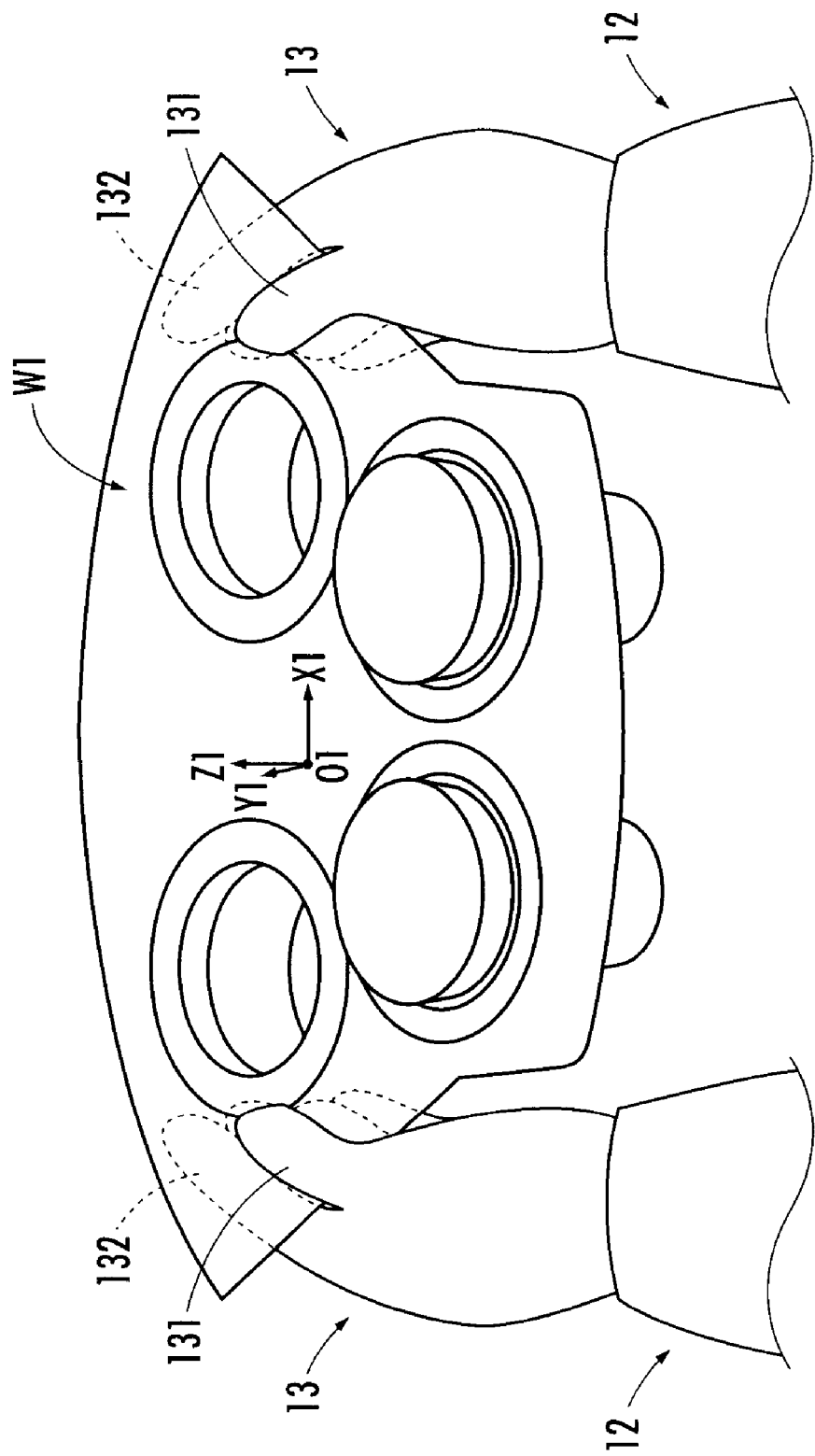
FIG. 12 is a functional explanatory view of the robot of the present invention.

A function of the robot 1 of the above construction will be explained. Specifically, a function for gripping a tray (first object) $W_1$ of an approximately trapezoidal shape placed on a cart (second object) $W_2$ by the robot 1 will be explained. "Gripping the tray $W_1$ by the robot 1 " means that the robot 1 grips both sides of the tray $W_1$ located forward by the left and right hands 13 as shown in FIG. 11. At this time, as shown in FIG. 12, the first finger mechanism 131 is located above the tray $W_1$ and the other finger mechanisms 132 to 135 are located below the tray $W_1$.

Figure 3:
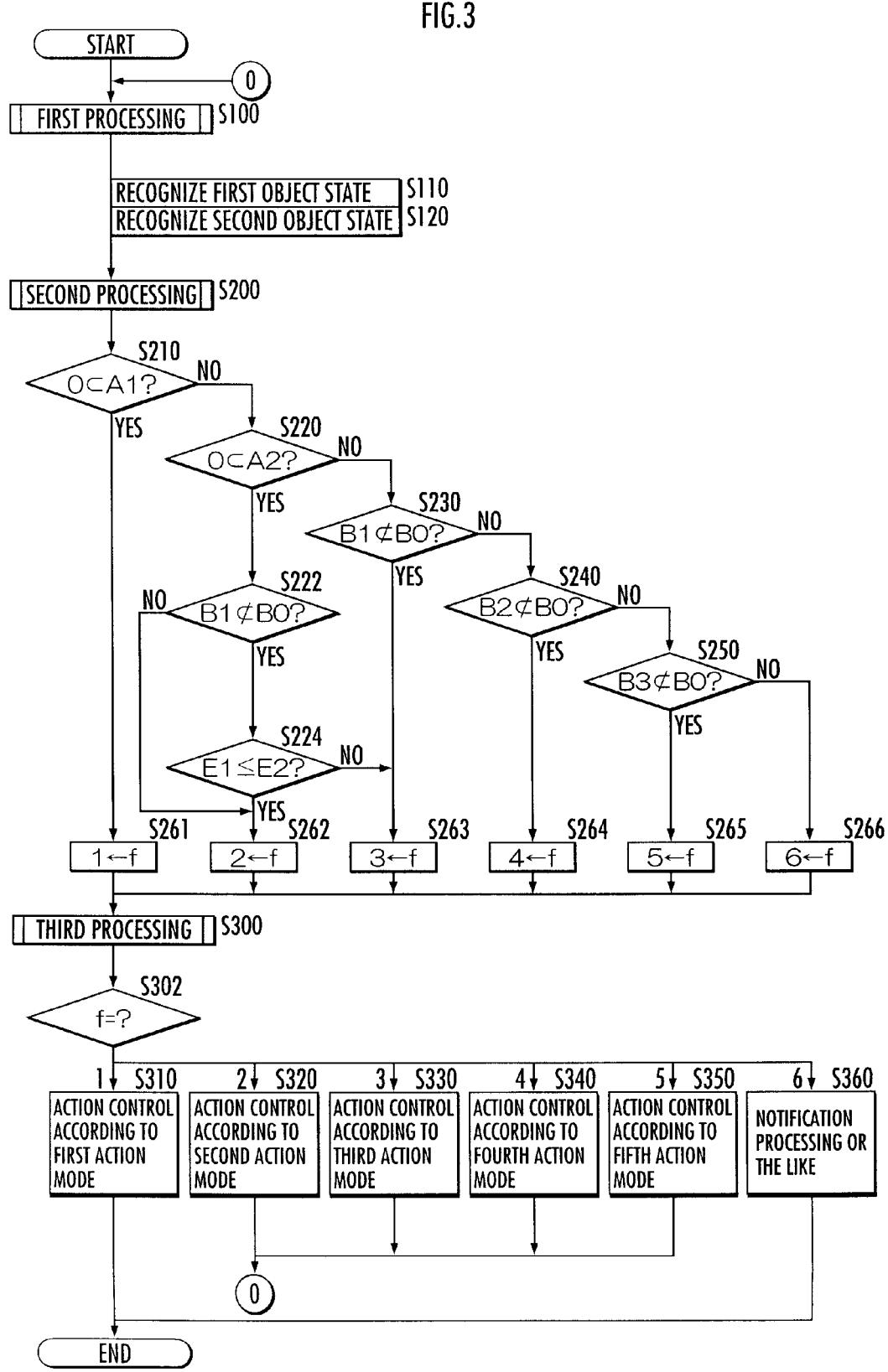
FIG. 3 is a functional explanatory view of the robot of the present invention.

First, the first processing section 210 executes "first processing" for measuring the relative position or the like of the tray $W_1$ with the robot 1 as a reference (FIG. 3/S100). In this embodiment, an origin O of a robot coordinate system (X, Y, Z) moved together with the robot 1 in a coordinate system at rest such as the center of gravity of the robot 1 and a heel position (=an intermediate position of left and right heels) or the like is defined as the position of the robot 1. When the positions of the tray $W_1$ and the cart $W_2$ are measured in the robot coordinate system, these measuring positions are immediately conformed to relative positions with the position of the robot 1 as a reference. Accordingly, the position measurement of the robot 1 is omitted. On the other hand, when the position of the robot 1 is measured in the coordinate system at rest, a vertical position (height from a floor face) of the robot 1 is recognized on the basis of angles of respective joints 141, 143, 145 of the leg 14, the lengths of the first leg link 142 and the second leg link 144 read from a memory or the like on the basis of the output of a rotary encoder 104. Further, a horizontal position (latitude and longitude) of the robot 1 is recognized on the basis of GPS information and the output of a sensor such as an unillustrated gyro sensor or the like.

Further, a +X direction, a +Y direction and a +Z direction in the robot coordinate system are defined as the posture of the robot 1. The posture of the robot 1 is recognized on the basis of the angles of respective joints 121, 123, 125, 141, 143, 145 based on the output of the rotary encoder 104, and the lengths or the like of respective arranged links 122, 124, 142, 144 read from a memory. For example, the posture of the base body 10 is recognized on the basis of relative rotation angles of the upper portion and the lower portion of the base body 10, and an inclination angle of the rotation axis based on the output of the gyro sensor with respect to the vertical direction. The posture of the arm 12 is recognized on the basis of the posture of the base body 10, the respective angles of the shoulder joint 121 and the elbow joint 123 of the arm 12, and the respective lengths of the first arm link 122 and the second arm link 124. The posture of the hand 13 is recognized on the basis of the posture of the arm 12 and the angle of the hand root joint 125.

The relative position and posture of the tray $W_1$ with each of the shape and size of the tray $W_1$ and the position and posture of the robot 1 as references are recognized as "a first object state" (FIG. 3/S110). The relative position of the tray $W_1$ is recognized as a position in the robot coordinate system of the origin $O_1$ of a first object coordinate system $(X_1, Y_1, Z_1)$ fixed to the tray $W_1$ (see FIG. 1). The relative posture of the tray $W_1$ is recognized as an inclination angle of each of a $+X_1$ direction, a $+Y_1$ direction and a $+Z_1$ direction of the first object coordinate system with respect to each of the +X direction, the +Y direction and the +Z direction of the robot coordinate system (see FIG. 1).

For example, the shape and size of the tray $W_1$ are recognized by receiving or reading these shape and size from an external information source of a server, a database or the like, or an internal information source such as a memory or the like. The shape and size of the tray $W_1$ may be also recognized on the basis of an image obtained through the head camera 102 and the waist camera 101.

Figure 4:
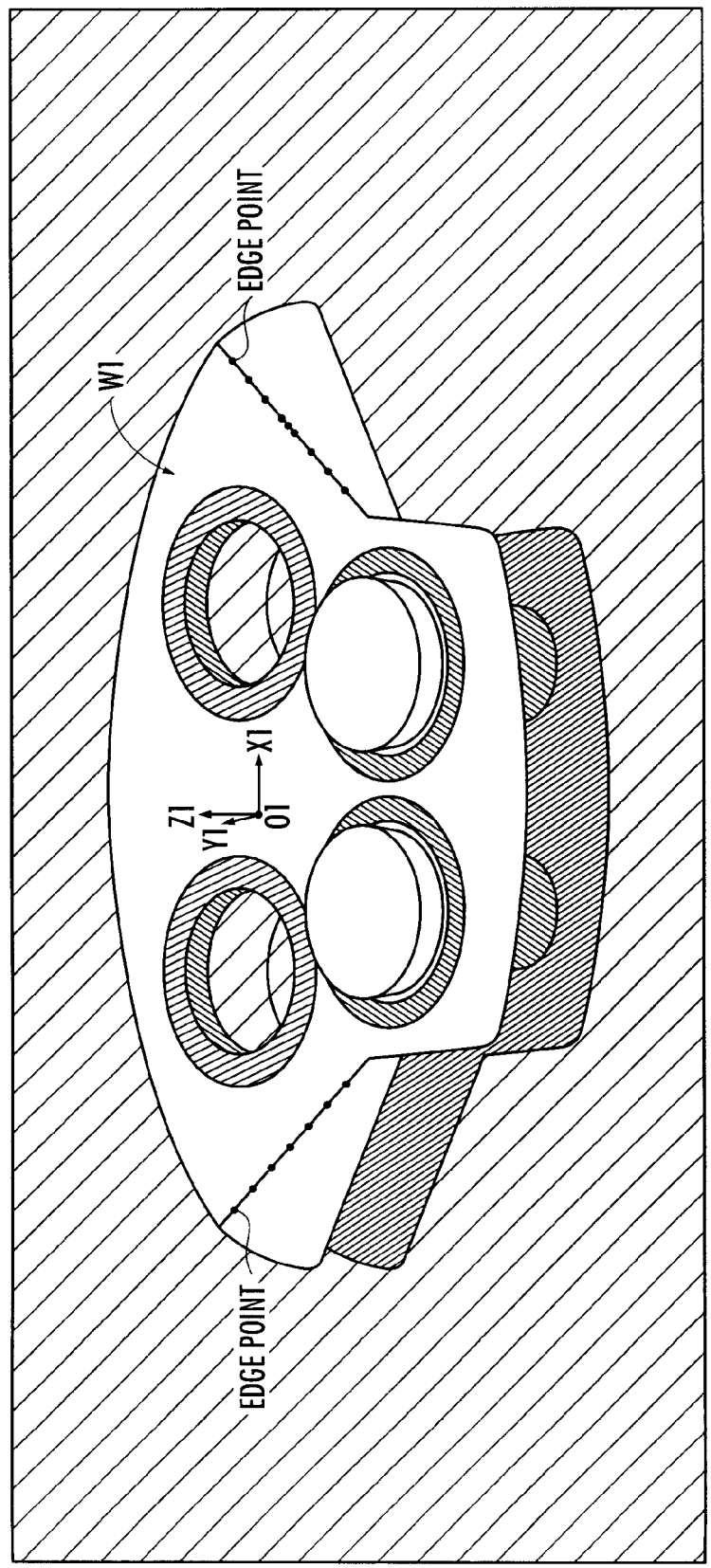
FIG. 4 is a functional explanatory view of the robot of the present invention.

The relative position and the relative posture of the tray $W_1$ are measured on the basis of an image analysis of the tray $W_1$ obtained through the head camera 102. For example, a gray scale image as shown in FIG. 4 is obtained by image processing of the tray $W_1$ obtained through the head camera 102. In this case, the relative position and the relative posture of the tray $W_1$ are recognized on the basis of the position of the head camera 102 in the robot coordinate system, the position and posture (inclination) of a boundary or an edge (a black circle is marked in FIG. 4) of a high luminance area and a low luminance area in the image, and the shape and size of the tray $W_1$. The position and posture of the tray $W_1$ may be also recognized by an image analysis obtained through the waist camera 101 and communication with a server.

Further, the relative position and posture of the cart $W_2$ with each of the shape and size of the cart (second object) $W_2$ and the position and posture of the robot 1 as references are recognized as "a second object state" (FIG. 3/S120). The relative position of the cart $W_2$ is recognized as a position in the robot coordinate system of an origin $O_2$ of a second object coordinate system $(X_2, Y_2, Z_2)$ fixed to the cart $W_2$ (see FIG. 1). The relative posture of the cart $W_2$ is recognized as an inclination angle of each of a $+X_2$ direction, a $+Y_2$ direction and a $+Z_2$ direction of the second object coordinate system with respect to each of the $+X$ direction, the $+Y$ direction and the $+Z$ direction of the robot coordinate system (see FIG. 1).

The shape and size of the cart $W_2$ are recognized by receiving or reading these shape and size from an external information source such as a server, a database or the like, or an internal information source such as a memory or the like. The shape and size of the cart $W_2$ may be also recognized on the basis of an image obtained through the head camera 102 and the waist camera 101.

Figure 5:
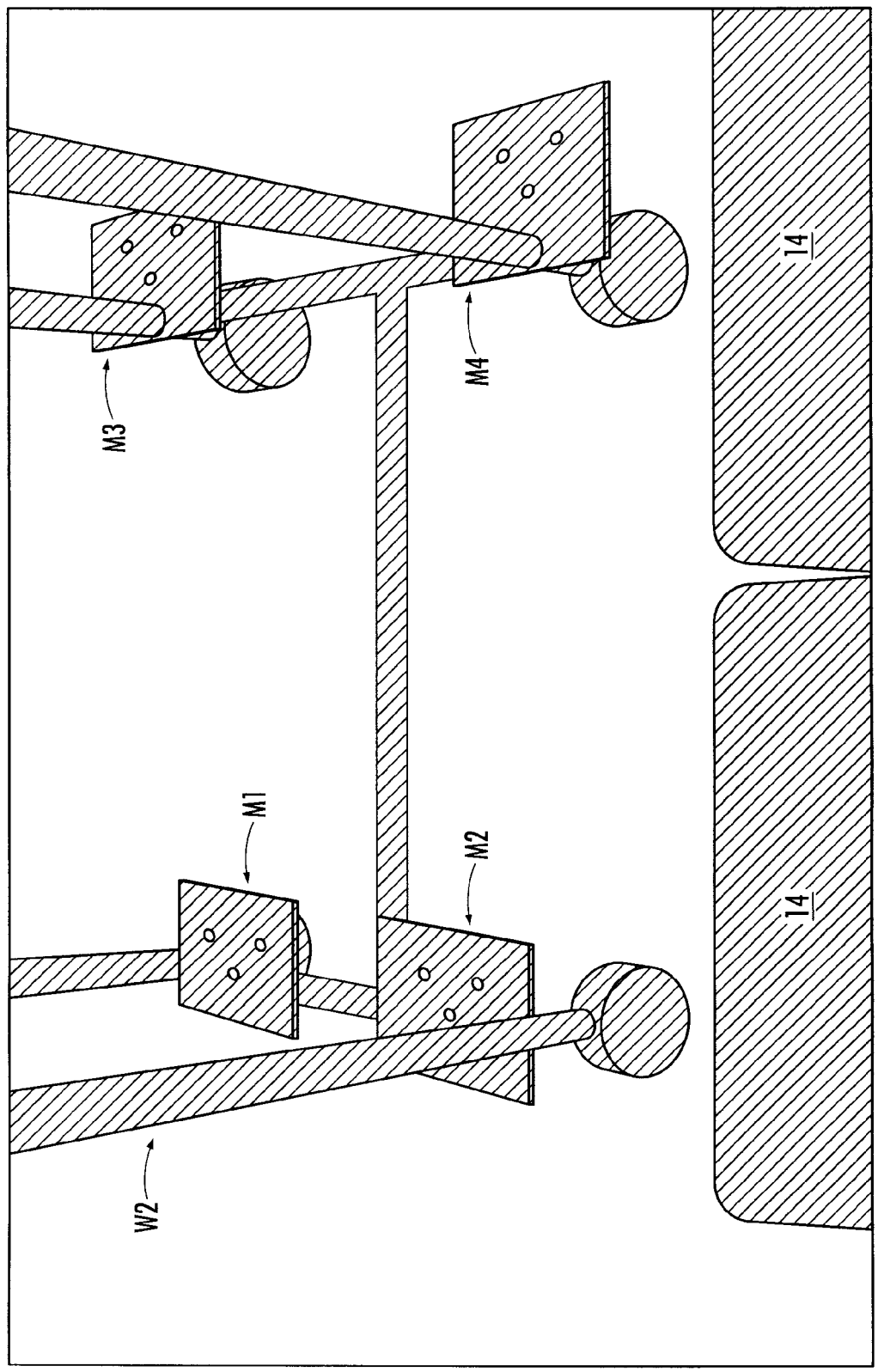
FIG. 5 is a functional explanatory view of the robot of the present invention.

The relative position and the relative posture of the cart $W_2$ are recognized by an image analysis of marks $M_1$ to $M_4$ given to the cart $W_2$ shown in FIG. 1 obtained through the waist camera 101. As shown in FIG. 5, marks $M_1$ to $M_4$ are constructed by three dots for reflecting a near infrared ray on four plates attached to four struts of the cart $W_2$. An image obtained by the waist camera 101 is binarization-processed so that only dots constituting marks $M_1$ to $M_4$ in the binarized image are recognized as the high luminance area. The position and posture of the cart $W_2$ are recognized on the basis of the position of the waist camera 101 in the robot coordinate system, positions in the images of marks $M_1$ to $M_4$, and the positions of marks $M_1$ to $M_4$ in the second object coordinate system read from a memory. An arranging pattern of three points constituting the respective marks $M_1$ to $M_4$ may be also distinguished so as to discriminate marks $M_1$ to $M_4$. The relative position and the relative posture of the cart $W_2$ may be also recognized by an image analysis of the cart $W_2$ obtained through the head camera 102 and communication with a server.

Subsequently, the second processing section 220 executes "second processing" for judging a state of the robot 1 on the basis of a measuring result provided by the first processing section 210 (FIG. 3/S200). In the execution of the second processing, an area next explained is set on the basis of the measuring result provided by the first processing section 210. For brevity of the explanation, a case in which the $+Z$ direction of the robot coordinate system and the $+Z_1$ direction of the first object coordinate system are parallel will be next considered. In this case, for example, the relative posture of the tray $W_1$ is expressed by the $+Y$ direction and posture angle $\theta$ of the first $+Y_1$ direction in the robot coordinate system (see FIG. 6).

First, a first operation area $A_1$, a second operation area $A_2$ and an operation shade area AH will be explained by using FIG. 6.

When the first object $W_1$ exists in the first operation area $A_1$, the first operation area $A_1$ means an area in which the robot 1 can grip the tray $W_1$ by the hand 13 by the first action element moving the arm 12 or the like on the spot in accordance with "the first action mode". "On the spot" means "without changing the position or the position and posture of the leg 14 by moving the leg 14 by means of the robot 1". The shape and width of the first operation area $A_1$ are changed in accordance with the relative posture of the tray $W_1$. This is because the relative posture of the tray $W_1$ in gripping the tray $W_1$ by the robot 1 is set in advance (see FIG. 12).

Figure 6:
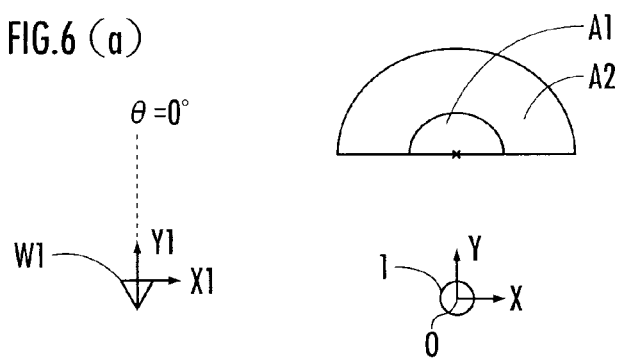
FIG. 6 is a functional explanatory view of the robot of the present invention.
Figure 6:
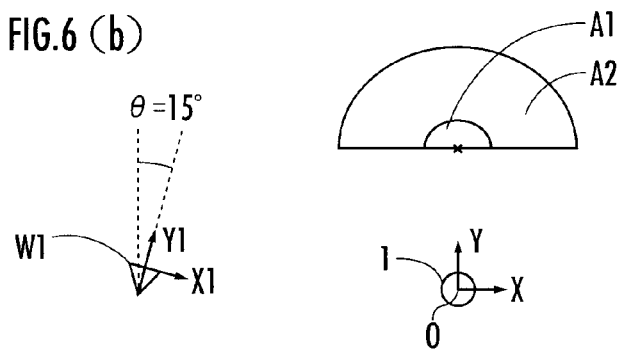
Figure 6:
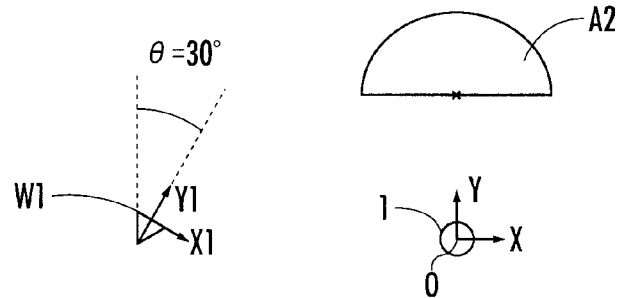
Figure 6:
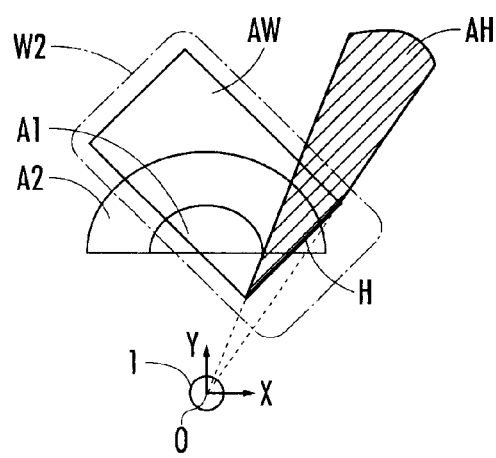

For example, when the posture angle $\theta$ is $0°$, as shown in FIG. 6(*a*), an area of an approximately semi-elliptical shape located in a forward direction ($+Y$ direction) of the robot 1 (simply expressed by a circle mark) is set as the first operation area $A_1$. A major axis portion of the first operation area $A_1$ of the approximately semi-elliptical shape is parallel to an XZ plane (or a basic front forehead face of the robot 1) in the robot coordinate system. The first operation area $A_1$ is contracted such the outer contour approaches a center as the posture angle $\theta$ increases from $0°$. When the posture angle $\theta$ exceeds a first threshold value $\theta_1$, the first operation area $A_1$ is vanished. For example, when $\theta=15°$ ($<\theta_1$), as shown in FIG. 6(*b*), a narrow first operation area $A_1$ is set in comparison with the case of $\theta=0°$. Further, when $\theta=30°$ ($>\theta_1$), no concrete first operation area $A_1$ is set as shown in FIG. 6(*c*).

When the first object $W_1$ exists in the second operation area $A_2$, the second operation area $A_2$ means an area in which the robot 1 can change the relative position or the like of the tray $W_1$ by the hand 13 by the first action element for moving the arm 12 or the like on the spot in accordance with "the second action mode". Similar to the first operation area A1, the shape and width of the second operation area $A_2$ are changed in accordance with the relative posture of the tray $W_1$.

For example, when the posture angle $\theta$ is $0°$, as shown in FIG. 6(*a*), an area of an approximately semi-ring shape or a horseshoe shape entirely circumscribed about an arc portion of the first operation area $A_1$ of the approximately semi-elliptical shape is set as the second operation area $A_2$. Similar to the first operation area $A_1$, as the posture angle $\theta$ increases from $0°$, the second operation area $A_2$ is contracted such that its outer contour approaches the center of the first operation area $A_1$. When the posture angle $\theta$ exceeds a second threshold value $\theta_2$, the second operation area $A_2$ is vanished. For example, when $\theta=15°$, as shown in FIG. 6(*b*), the narrow second operation area $A_2$ of an approximately horseshoe shape is set in comparison with the case of $\theta=0°$. Further, when $\theta=30°$, the second operation area $A_2$ of an approximately semi-elliptical shape is set as shown in FIG. 6(*c*). Further, when $\theta$ exceeds the second threshold value $\theta_2$, no concrete second operation area $A_2$ is set. The second operation area $A_2$ is located outside the first operation area $A_1$ seen from the robot 1 because a range able to make the robot 1 stretch-out both the hands 13 to grip the tray $W_1$ is narrower than a range able to make the robot 1 stretch-out one of the left and right hands 13 to push and pull the tray $W_1$.

As shown in FIG. 6(*d*), the operation shade area AH means an area (hatched portion) which becomes a shade of a handle (line segment) H seen from the robot 1 (origin O of the robot coordinate system). An area ($=A_1-(A_1 \cap AH)$) removing an overlapping area with the operation shade area AH from the first operation area $A_1$ is set as the final first operation area $A_1$. Similarly, an area ($=A_2-(A_2 \cap AH)$) removing an overlapping area with the operation shade area AH from the second operation area $A_2$ is set as the final second operation area $A_2$.

Subsequently, a penetration prohibitive area $B_0$, a first reference area $B_1$, a second reference area $B_2$, a third reference area $B_3$ and a reference shade area BH will be explained by using FIG. 7.

When the robot 1 exists in the penetration prohibitive area $B_0$, the penetration prohibitive area $B_0$ means an area in which the robot 1 cannot grip the tray $W_1$ or the relative position or the like of the tray $W_1$ by the hand 13 while avoiding contact with the cart $W_2$. For example, as shown in FIG. 7, an area (an area surrounded by a two-dotted chain line) surrounding the cart $W_2$ is set as the penetration prohibitive area $B_0$.

When the robot 1 exists in the first reference area $B_1$, the first reference area $B_1$ means an area in which the robot 1 can grip the tray $W_1$ on the spot. For example, as shown in FIG. 7, an area of an approximately semi-elliptical shape located in a backward direction ($-Y_1$ direction) of the tray $W_1$ is set as the first reference area $B_1$. A major axis portion of the first reference area $B_1$ of the approximately semi-elliptical shape is parallel to an $X_1Z_1$ plane in the first object coordinate system.

When the robot 1 exists in the second reference area $B_2$, the second reference area $B_2$ means an area in which the robot 1 can change the relative position or the like of the tray $W_1$ by the hand 13 on the spot. For example, as shown in FIG. 7, an area of an approximately semi-ring shape or a horseshoe shape entirely circumscribed about an arc portion of the first reference area $B_1$ is set as the second reference area $B_2$. The second reference area $B_2$ is located outside the first reference area $B_1$ seen from the tray $W_1$ because no robot 1 can grip the tray $W_1$ when no robot 1 is comparatively close to the tray $W_1$, and the robot 1 can push and pull the tray $W_1$ even when the robot 1 is comparatively far away from the tray $W_1$.

When the robot 1 exists in the third reference area $B_3$, the third reference area $B_3$ means an area in which the robot 1 can change the relative position or the like of the tray $W_1$ by the hand 13 on the spot, and can then move to a suitable place so that the robot 1 can grip the tray $W_1$ or the like. For example, as shown in FIG. 7, with respect to a composite area $B_1+B_2$ of the first reference area $B_1$ and the second reference area $B_2$, an area of an approximately elliptical shape symmetrical in mirror reflection with the tray $W_1$ as a reference is set as the third reference area $B_3$.

Figure 7:
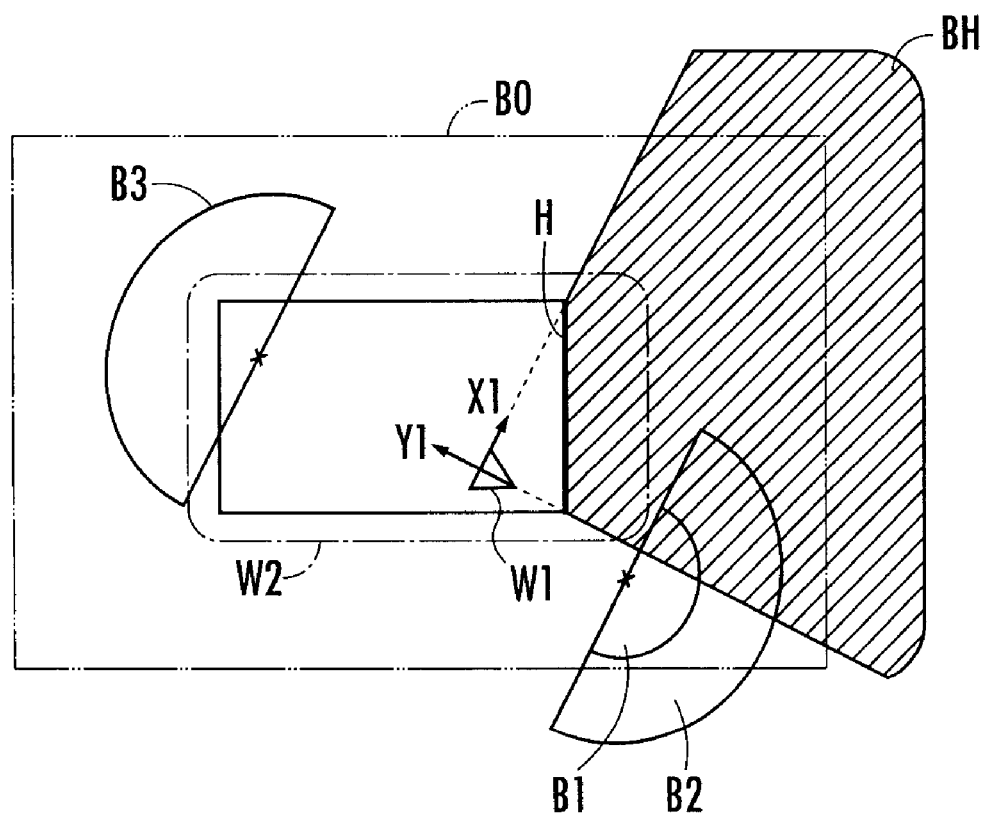
FIG. 7 is a functional explanatory view of the robot of the present invention.

As shown in FIG. 7, the reference shade area BH means an area (hatched portion) which becomes a shade of the handle (line segment) H seen from the tray $W_1$ (origin $O_1$ of the first object coordinate system). An area $(=B_1-(B_1 \cap BH))$ removing an overlapping area with the reference shade area BH from the first reference area $B_1$ is set as the final first reference area $B_1$. Further, an area $(=B_2-(B_2 \cap BH))$ removing an overlapping area with the reference shade area BH from the second reference area $B_2$ is set as the final second reference area $B_2$. Further, an area $(=B_3-(B_3 \cap BH))$ removing an overlapping area with the reference shade area BH from the third reference area $B_3$ is finally recognized as the third reference area $B_3$. Similar to the first operation area $A_1$ and the second operation area $A_2$, each of the first reference area $B_1$, the second reference area $B_2$ and the third reference area $B_3$ may be also variably set in accordance with the relative posture of the tray $W_1$ with the robot 1 as a reference.

Here, it is returned to the flow chart of FIG. 3 and details of the second processing will be explained.

First, it is judged whether or not the robot 1 is in "a first state" able to act in accordance with the first action mode (FIG. 3/S210). Specifically, it is judged whether the first object $W_1$ (=origin $O_1$ of the first object coordinate system) exists in the first operation area $A_1$ or not. "The first action mode" means an action mode in which the robot 1 moves the arm 12 or the like on the spot and grips the tray $W_1$ by the hand 13.

When it is judged that the robot 1 is in the "first state", i.e., as shown in FIG. 8(a), it is judged that the tray $W_1$ exists in the first operation area $A_1$ (FIG. 3/S210 - - - YES), a flag f showing the state of the robot 1 is set to "1" (FIG. 3/S261).

When it is judged that no robot 1 is in the first state (FIG. 3/S210 - - - NO), it is judged whether or not the robot 1 is in "a second state" able to act in accordance with the second action mode (FIG. 3/S220). Specifically, it is judged whether the first object $W_1$ exists in the second operation area $A_2$ or not. "The second action mode" means an action mode in which the robot 1 is changed to the first state as a result of changing the relative position or the like of the first object $W_1$ by moving the arm 12 or the like by means of the robot 1 on the spot.

Further, when it is judged that the robot 1 is in the "second state", i.e., as shown in FIG. 8(b), it is judged that the tray $W_1$ exists in the second operation area $A_2$ (FIG. 3/S220 - - - YES), it is judged whether or not the robot 1 is in "a third state" able to act in accordance with the third action mode (FIG. 3/S222). Specifically, it is judged whether "a first advancing condition" is satisfied or not. The first advancing condition is a condition in which at least one portion of the first reference area $B_1$ (or $B_1-(B_1 \cap BH)$) is projected out of the penetration prohibitive area $B_0$. "The third action mode" means an action mode in which the robot 1 moves so that the robot 1 is changed to the first state as a result of changing the relative position or the like of the first object $W_1$.

When it is judged that no robot 1 is in the "third state", i.e., it is judged that the entire first reference area $B_1$ is included in the penetration prohibitive area $B_0$ (FIG. 3/S222 - - - NO), the flag f showing the state of the robot 1 is set to "2" (FIG. 3/S262).

Figure 9:
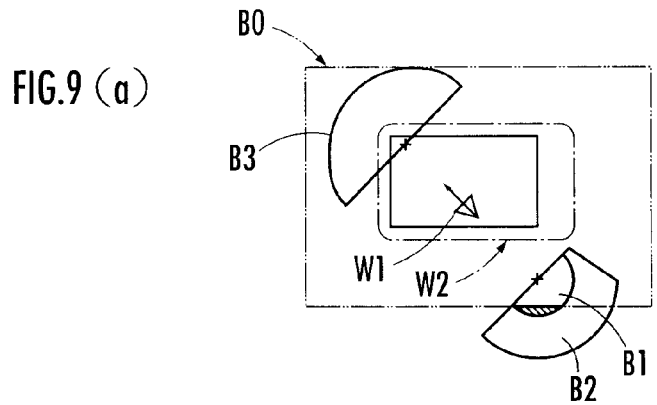
FIG. 9 is a functional explanatory view of the robot of the present invention.
Figure 9:
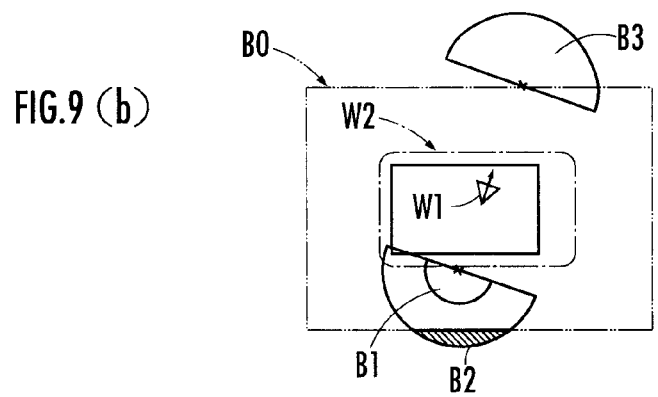
Figure 9:
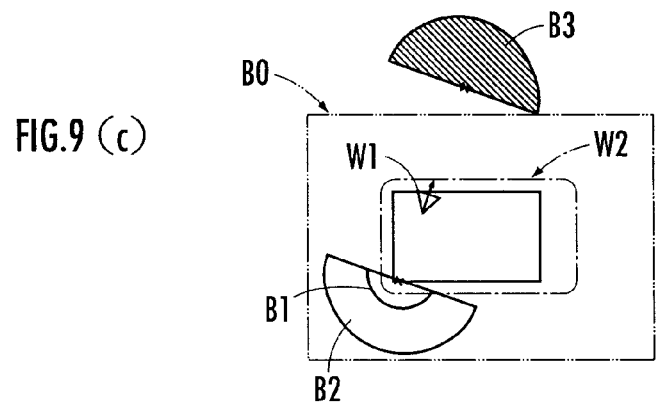
Figure 9:
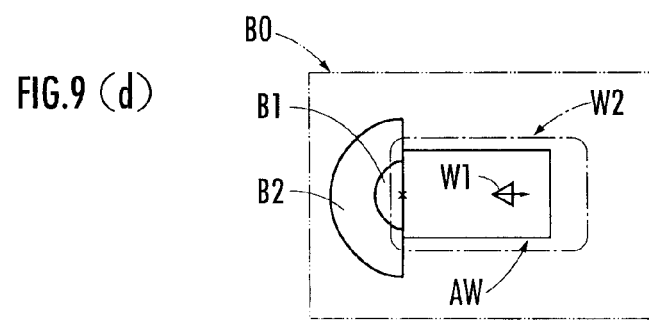

When it is judged that the robot 1 is in the "third state", i.e., as shown in FIG. 9(a), it is judged that at least one portion of the first reference area $B_1$ is projected out of the penetration prohibitive area $B_0$ (FIG. 3/S222 - - - YES), it is judged whether or not first cost $E_1$ is second cost $E_2$ or less (FIG. 3/S224). In FIG. 9(a), the second reference area $B_2$ is formed in a horseshoe shape partially cut by the reference shade area BH (see FIG. 7).

First cost $E_1$ is an index showing one or both of time and energy required to change the robot 1 from the second state to the first state by moving the arm 12 or the like by means of the robot 1 on the spot and changing the relative position or the like of the tray $W_1$ by the hand 13 in accordance with the second action mode. For example, when the relative position or the like of the tray $W_1$ is corrected plural times by the hand 13, first cost $E_1$ is evaluated in accordance with the following expression on the basis of an operation time $t_1$ per one time of the hand 13 for the correction, a correction amount $d_1$ of the relative position, a correction amount $\delta d_1$ per one time of the relative position, a correction amount $\theta_1$ of the relative posture (posture angle), and a correction amount $\delta\theta_1$ per one time of the relative posture.

$$E_1=(\mathrm{mod}(d_1/\delta d_1)+\mathrm{mod}(\theta_1/\delta\theta_1))\cdot t_1 \quad (1)$$

Second cost $E_2$ is an index showing one or both of time and energy required to change the robot 1 from the third state to the first state by moving the robot 1 in accordance with the third action mode. For example, when the relative position or the like of the tray $W_1$ is corrected plural times by the movement of the leg 14, second cost $E_2$ is evaluated in accordance with the following expression (2) on the basis of an operation time $t_2$ per one time or one step of the leg 14 for the correction, a correction amount $d_2$ of the relative position, a correction amount $\delta d_2$ per one time of the relative position, a correction amount $\theta_2$ of the relative posture (posture angle), and a correction amount $\delta\theta_2$ per one time of the relative posture.

$$E_2=(\mathrm{mod}(d_2/\delta d_2)+\mathrm{mod}(\theta_2/\delta\theta_2))\cdot t_2 \quad (2)$$

When it is judged that first cost $E_1$ is second cost $E_2$ or less (FIG. 3/S224 - - - YES), flag f is set to "2" (FIG. 3/S262). On the other hand, when it is judged that first cost $E_1$ exceeds second cost $E_2$ (FIG. 3/S224 - - - NO), flag f is set to "3" (FIG. 3/S263).

Further, when it is judged that no robot 1 is in the "second state", i.e., as shown in FIG. 8(c), it is judged that no tray $W_1$ exists in each of the first operation area $A_1$ and the second operation area $A_2$ (FIG. 3/S220 - - - NO), it is judged whether or not the robot 1 is in "a third state" able to act in accordance with the third action mode by a technique similar to that of the above case (FIG. 3/S230). When it is judged that the robot 1 is in the "third state" (FIG. 3/S230 - - - YES), flag f is set to "3" (FIG. 3/S263).

When it is judged that no robot 1 is in the "third state" (FIG. 3/S230 - - - NO), it is judged whether or not the robot 1 is in "a fourth state" able to act in accordance with the fourth action mode (FIG. 3/S240). Specifically, it is judged whether "a second advancement condition" is satisfied or not. The second advancement condition is a condition in which the entire first reference area $B_1$ is included in the penetration prohibitive area $B_0$, and at least one portion of the second reference area $B_2$ (or $B_2-(B_2 \cap BH)$) is projected out of the penetration prohibitive area $B_0$. "The fourth action mode" means an action mode in which the robot 1 is changed to the second state as a result of changing the relative position or the like of the first object $W_1$ by moving the robot 1.

When it is judged that the robot 1 is in the "fourth state", i.e., as shown in FIG. 9(b), it is judged that at least one portion of the second reference area $B_2$ is projected out of the penetration prohibitive area $B_0$ (FIG. 3/S240 - - - YES), flag f is set to "4" (FIG. 3/S264).

When it is judged that no robot 1 is in the "fourth state", i.e., it is judged that all portions of each of the first reference area $B_1$ and the second reference area $B_2$ are included in the penetration prohibitive area $B_0$ (FIG. 3/S240 - - - NO), it is judged whether or not the robot 1 is in "a fifth state" able to act in accordance with the fifth action mode (FIG. 3/S250). Specifically, it is judged whether "a third advancement condition" is satisfied or not. The third advancement condition is a condition in which all portions of each of the first reference area $B_1$ and the second reference area $B_2$ are included in the penetration prohibitive area $B_0$, and at least one portion of the third reference area $B_3$ is projected out of the penetration prohibitive area $B_0$. "The fifth action mode" means an action mode in which the robot 1 is changed to the third or fourth state as a result of changing the relative position or the like of the tray $W_1$ by the hand 13 by moving the arm 12 or the like on the spot by means of the robot 1.

When it is judged that the robot 1 is in the "fifth state", i.e., as shown in FIG. 9(c), it is judged that all portions of each of the first reference area $B_1$ and the second reference area $B_2$ are included in the penetration prohibitive area $B_0$, and at least one portion of the third reference area $B_3$ are projected out of the penetration prohibitive area $B_0$ (FIG. 3/S250 - - - YES), flag f is set to "5" (FIG. 3/S265).

On the other hand, when it is judged that no robot 1 is in the "fifth state", i.e., as shown in FIG. 9(d), it is judged that all portions of each of the reference areas $B_1$ to $B_3$ are included in the penetration prohibitive area $B_0$ (FIG. 3/S250 - - - NO), flag f is set to "6" (FIG. 3/S266). In the state shown in FIG. 9(d), since the third reference area $B_3$ is perfectly overlapped with the reference shade area BH, no third reference area $B_3$ is substantially set (see FIG. 7).

Next, the third processing section 230 executes "third processing" for controlling the action of the robot 1 on the basis of a judging result provided by the second processing section 220 (FIG. 3/S300). First, flag f showing the state of the robot 1 is discriminated (FIG. 3/S302).

In the case of f=1, the action of the robot 1 is controlled in accordance with the "first action mode" (FIG. 3/S310). Thus, the robot 1 does not move and moves the arm 12 or the like on the spot so that the tray $W_1$ is gripped by the left and right hands 13 as shown in FIGS. 11 and 12. A series of processings for gripping the tray $W_1$ by the robot 1 is then terminated.

In the case of f=2, the action of the robot 1 is controlled in accordance with the "second action mode" (FIG. 3/S320). Thus, the robot 1 does not move and moves the arm 12 or the like on the spot so that the relative position or the like of the tray $W_1$ is changed by the hand 13. As a result, the robot 1 is changed from the second state to the first state. Specifically, the relative position and the relative posture of the tray $W_1$ are respectively adjusted so as to be conformed to a desired position and a desired posture. For example, a posture for reducing the posture angle θ (see FIGS. 6(a) to (c)) as much as possible is set as the desired posture of the tray $W_1$. Further, in the first operation area $A_1$ (see FIG. 6(a)), a position conformed or closest to an edge portion of a placing area AW (see FIG. 6(d)) of the tray $W_1$ in the cart $W_2$ is set as the desired position of the tray $W_1$.

In the case of f=3, the action of the robot 1 is controlled in accordance with the "third action mode" (FIG. 3/S330). Thus, the robot 1 is changed from the third state to the first state as a result of changing the relative position or the like of the tray $W_1$ by moving the robot 1. Specifically, the robot 1 moves to a portion (hatched portion) projected out of the penetration prohibitive area $B_0$ in the first reference area $B_1$ shown in FIG. 9(a).

In the case of f=4, the action of the robot 1 is controlled in accordance with the "fourth action mode" (FIG. 3/S340). Thus, the robot 1 is changed from the fourth state to the second state as a result of changing the relative position or the like of the tray $W_1$ by moving the robot 1. Specifically, the robot 1 moves to a portion (hatched portion) projected out of the penetration prohibitive area $B_0$ in the second reference area $B_2$ shown in FIG. 9(b).

In the case of f=5, the action of the robot 1 is controlled in accordance with the "fifth action mode" (FIG. 3/S350). Thus, the robot 1 is changed from the fifth state to the third or fourth state as a result of changing the relative position or the like of the tray $W_1$ by moving the robot 1. Specifically, the robot 1 moves to a portion (hatched portion) projected out of the penetration prohibitive area $B_0$ in the third reference area $B_3$ shown in FIG. 9(c). The relative position or the like of the tray $W_1$ is then changed by the hand 13 by moving the arm 12 or the like on the spot by means of the robot 1 so as to realize the state shown in FIG. 9(a) or 9(b).

Figure 10:
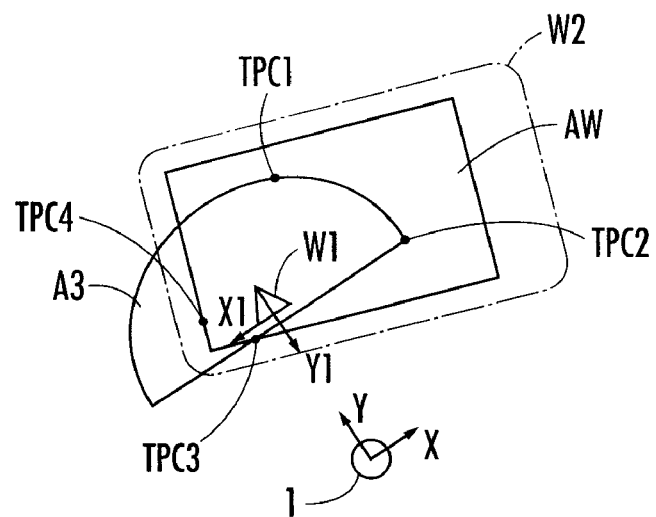
FIG. 10 is a functional explanatory view of the robot of the present invention.
Figure 10:
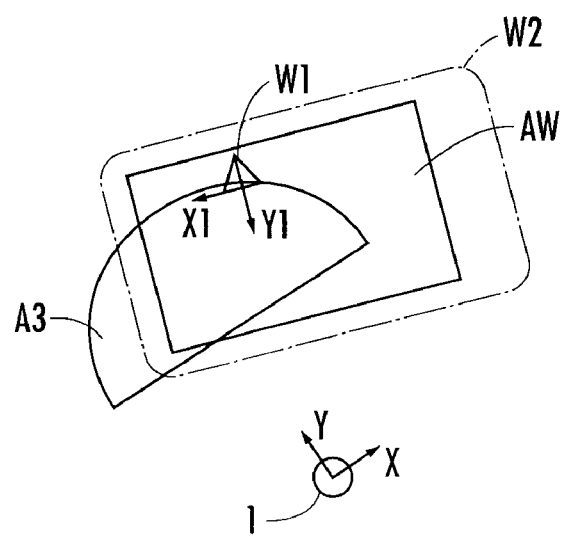

A third operation area $A_3$ and the placing area AW of the tray $W_1$ in the cart $W_2$ are set on the basis of the measuring result of the first processing section 210 to set the desired position and the desired posture of the tray $W_1$ when the robot 1 acts in accordance with the fifth action mode. The third operation area $A_3$ means an area in which the robot 1 can stretch-out the hand 13 on the spot. For example, as shown in FIG. 10(a), an area of an approximately semi-elliptical shape located in the forward direction of the robot 1 is set as the third operation area $A_3$. The third operation area $A_3$ of the approximately semi-elliptical shape is expressed with its major axis portion as a line segment parallel to the XZ plane in the robot coordinate system. With respect to the third operation area $A_3$, similar to the first operation area $A_1$ and the second operation area $A_2$, an area removing an overlapping area (see a hatched portion of FIG. 6(d)) with the operation shade area AH is set as the final third operation area $A_3$.

In the third operation area $A_3$, the position of a point (point on a boundary) having a shortest distance with respect to a side not intersecting or coming in contact with the third operation area $A_3$ among four sides of the placing area AW is set as desired position candidates $TP_{C1}$ and $TP_{C2}$ (see FIG. 10(a)). Further, the position of a point included in the third operation area $A_3$ and having a shortest distance with respect to the tray $W_1$ on a side intersecting or coming in contact with the third operation area $A_3$ among the four sides of the placing area AW is set as desired position candidates $TP_{C3}$ and $TP_{C4}$ (see FIG. 10(a)). For example, a candidate for minimizing a posture changing amount (a changing amount of angle θ) of the tray $W_1$ among the desired position candidates $TP_{C1}$ to $TP_{C4}$ is set as the desired position. Thus, for example, the position of the tray $W_1$ (desired position candidate $TP_{C1}$ in FIG. 10(a)) shown in FIG. 10(b) is set as the desired position.

Further, a posture in which the $Y_1Z_1$ plane of the first object coordinate system (see FIG. 1) is perpendicular with respect to a side closest from the desired position of the tray $W_1$ among the four sides of the placing area AW, and the $-Y_1$ direction is directed to the outside of the cart $W_2$, is set as the desired posture of the tray $W_1$. Thus, for example, the posture of the tray $W_1$ shown in FIG. 10(b) is set as the desired posture.

In the case of f=6, the action of the robot 1 according to one of the first to fifth action modes is inhibited, and its action is controlled so as to externally notify that no robot 1 is in each of the first to fifth states (FIG. 3/S360). For example, it is notified that no robot 1 is in each of the first to fifth states by a mode in which a voice is outputted from an unillustrated speaker arranged in the robot 1, or an unillustrated LED or the like arranged in the robot 1 is turned on and off or the like.

In accordance with the robot 1 fulfilling the above function, when it is judged that the robot 1 is in the "first state", the action of the robot 1 is controlled in accordance with the "first action mode" (see FIG. 3/S210 - - - YES, S310). When the tray $W_1$ exists in the first operation area $A_1$ determined on the basis of the position and posture of the robot 1, it is judged that the robot 1 is in the first state. Thus, the robot 1 does not move and moves the arm 12 or the like on the spot so that the tray (first object) $W_1$ can be gripped by both the hands 13 as shown in FIGS. 11 and 12. Further, since an overlapping area with the operation shade area AH is suitably deleted from the first operation area $A_1$ (see FIG. 6(d)), it is avoided that the arm 12 or the like comes in contact with the handle H when the robot 1 moves the arm 12 or the like to grip the tray $W_1$ on the spot.

On the other hand, when it is judged that no robot 1 is in the first state, the robot acts in an action mode different from the first action mode so that the relative position or the like of the tray $W_1$ with the robot as a reference is changed. As a result, the robot 1 can be changed to the first state (see FIG. 3/S210 - - - NO, S320 to S350).

Figure 13:
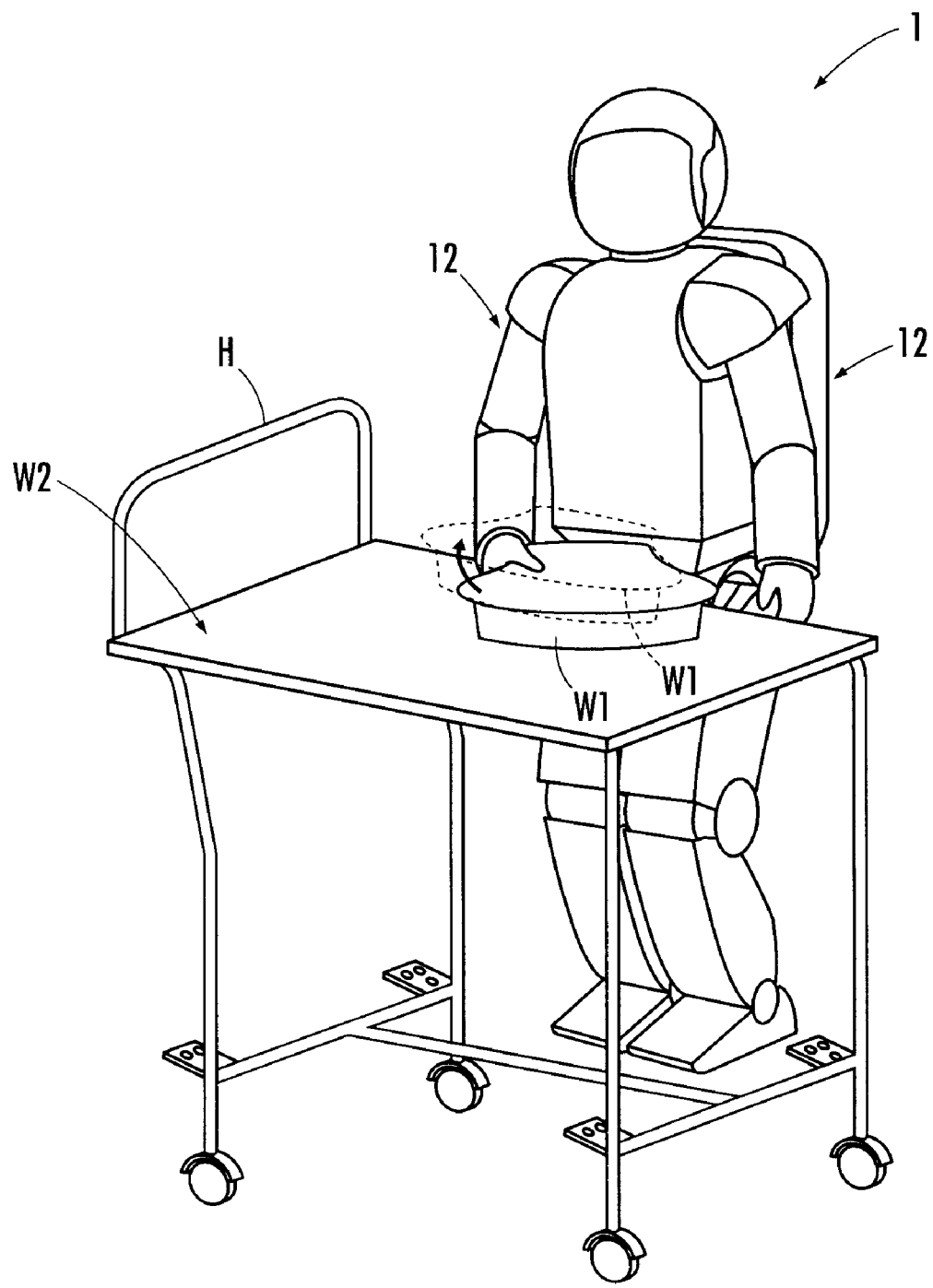
FIG. 13 is a functional explanatory view of the robot of the present invention.

Specifically, when it is judged that the robot 1 is in the "second state", the action of the robot 1 is controlled in accordance with the "second action mode" (see FIG. 3/S220 - - - YES, S320). Thus, as shown in FIG. 13, the relative position or the like of the tray $W_1$ is adjusted by the hand 13 by moving the arm 12 or the like on the spot by means of the robot 1. As a result, the robot 1 can be changed from the second state to the first state. For example, the first operation area Al can appear or be extended by changing the relative posture of the tray $W_1$ by the hand 13 (see FIGS. 6(a) to (c)). Further, it is possible to realize a state in which the tray $W_1$ is included in the first operation area $A_1$ by changing the relative position of the tray $W_1$ by the hand 13 (see FIGS. 8(a) to (c)). The tray $W_1$ can be gripped by both the hands 13 by moving the arm 12 or the like on the spot by means of the robot 1 in accordance with the first action mode (see FIG. 11). Further, since an overlapping area with the operation shade area AH is suitably deleted from the second operation area $A_2$ (see FIG. 6(d)), it is avoided that the arm 12 or the like comes in contact with the handle H when the robot 1 moves the arm 12 or the like to change the relative position or the like of the tray $W_1$ by the hand 13 on the spot.

Figure 14:
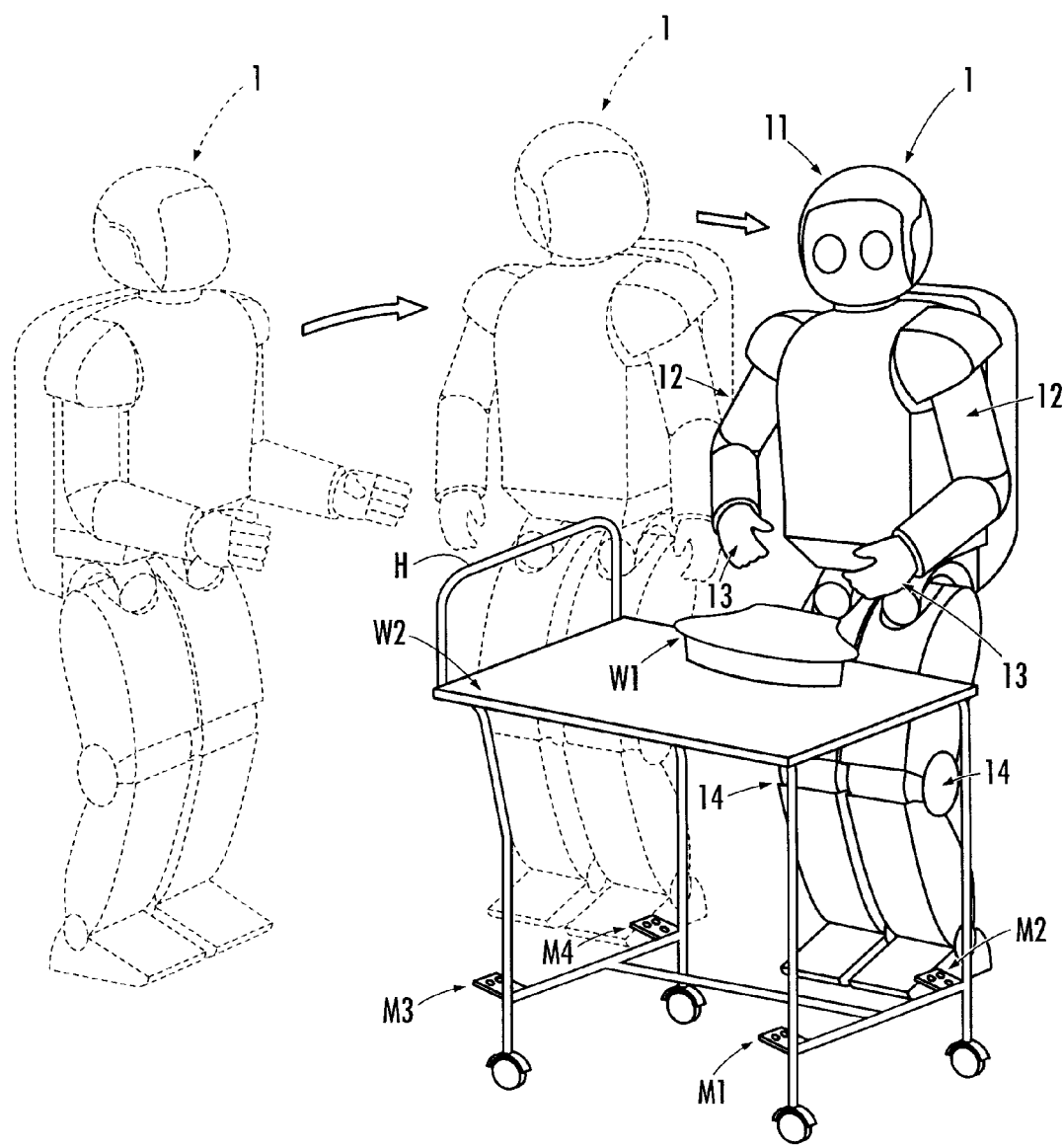
FIG. 14 is a functional explanatory view of the robot of the present invention.

Further, when it is judged that the robot 1 is in the "third state", the action of the robot 1 is controlled in accordance with the "third action mode" (see FIG. 3/S230 - - - YES, S330). Thus, as shown in FIG. 14, while the robot 1 avoids the advancement into the penetration prohibitive area $B_0$, the robot 1 moves to a projecting-out area (=$B_1$−($B_0 \cap B_1$)) from the penetration prohibitive area $B_0$ in the first reference area $B_1$ (see a hatched portion of FIG. 9(a)). The robot 1 can be changed from the third state to the first state as a result of adjusting the relative position or the like of the tray $W_1$ by moving the robot 1. For example, the first operation area $A_1$ can appear or be extended by changing the relative posture of the tray $W_1$ by moving the robot 1 (see FIGS. 6(a) to (c)). Further, it is possible to realize a state in which the tray $W_1$ is included in the first operation area $A_1$ by changing the relative position of the tray $W_1$ by moving the robot 1 (see FIGS. 8(a) to (c)). Namely, the robot 1 can grip the tray $W_1$ by both the hands 13 by moving the arm 12 or the like on the spot (see FIG. 11). Further, since an overlapping area with the reference shade area BH is suitably deleted from the first reference area $B_1$ (see FIG. 7), it is avoided that the handle H becomes an obstacle when the arm 12 or the like is moved to grip the tray $W_1$ on the spot although the robot 1 had moved.

Further, when it is judged that the robot 1 is in the "fourth state", the action of the robot 1 is controlled in accordance with the "fourth action mode" (see FIG. 3/S240 - - - YES, S340). Thus, while it is avoided that the robot 1 advances into the penetration prohibitive area $B_0$, the robot 1 can move to a projecting-out area (=$B_2$−($B_0 \cap B_2$)) from the penetration prohibitive area $B_0$ in the second reference area $B_2$ (see a hatched portion of FIG. 9(b)). The robot 1 can be changed from the fourth state to the second state as a result of adjusting the relative position or the like of the tray $W_1$ by moving the robot 1. For example, the second operation area $A_2$ can appear or be extended by changing the relative posture of the tray $W_1$ by moving the robot 1 (see FIGS. 6(a) to (c)). Further, it is possible to realize a state in which the tray $W_1$ is included in the second operation area $A_2$ by changing the relative position of the tray $W_1$ by moving the robot 1 (see FIGS. 8(a) to (c)). Further, since an overlapping area with the reference shade area BH is suitably deleted from the second reference area $B_2$ (see FIG. 7), it is avoided that the handle H becomes an obstacle when the arm 12 or the like is moved to change the relative position or the like of the tray $W_1$ on the spot although the robot 1 had moved.

Then, the relative position or the like of the tray $W_1$ is changed by the hand 13 by moving the arm 12 or the like on the spot by means of the robot 1 so that the robot 1 can be changed from the second state to the first state (see FIG. 13). The tray $W_1$ can be gripped by the hand 13 by moving the arm 12 or the like on the spot by means of the robot 1 (see FIG. 11).

Figure 15:
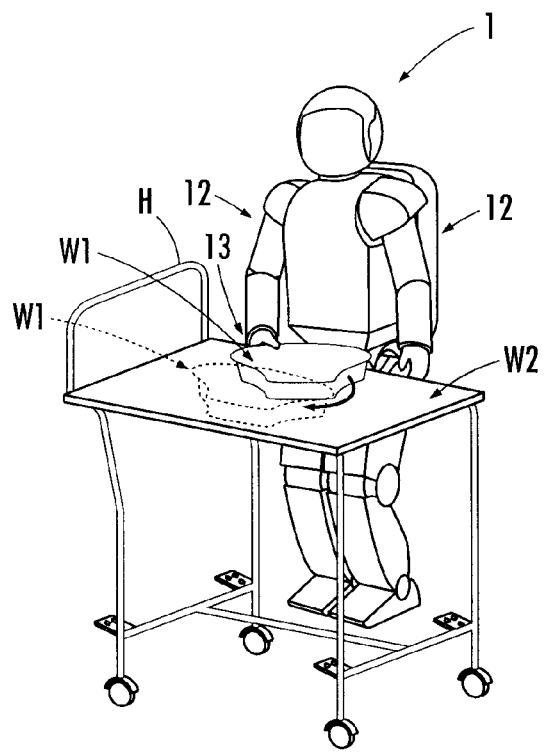
FIG. 15 is a functional explanatory view of the robot of the present invention.
Figure 15:
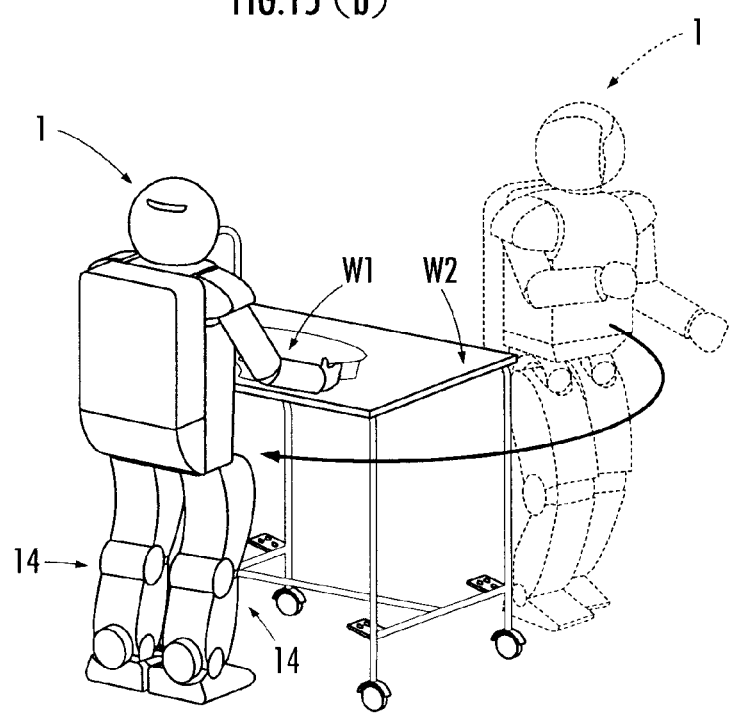

Further, when it is judged that the robot 1 is in the "fifth state", the action of the robot 1 is controlled in accordance with the "fifth action mode" (see FIG. 3/S240 - - - NO, S250 - - - YES, S350). Thus, while it is avoided that the robot 1 advances into the penetration prohibitive area $B_0$, the robot 1 moves to a projecting-out area (=$B_3$−($B_0 \cap B_3$)) from the penetration prohibitive area $B_0$ in the third reference area $B_3$ (see a hatched portion of FIG. 9(c) and FIG. 14). Further, the robot 1 moves the arm 12 or the like at the moving destination so that the tray $W_1$ is pushed by the hand 13 or the like and the relative position or the like of the tray $W_1$ is adjusted as shown in FIG. 15(a). As a result, the robot 1 can be changed from the fifth state to the third or fourth state. Further, since an overlapping area with the reference shade area BH is suitably deleted from the third reference area $B_3$ (see FIG. 7), it is avoided that the handle H becomes an obstacle when the arm 12 or the like is moved to change the relative position or the like of the tray $W_1$ on the spot although the robot 1 had moved.

Then, the relative position or the like of the tray $W_1$ is adjusted by moving the robot 1 as shown in FIG. 15(b). As a result, the robot 1 can be changed from the third state to the first state, or the robot 1 can be changed from the fourth state to the second state and can be further changed from the second state to the first state. The tray $W_1$ can be then gripped by the hand 13 by moving the arm 12 or the like on the spot by means of the robot 1 (see FIG. 11).

Further, if it is judged that the robot 1 is in a state wherein the robot is unable to be changed to one of the first, second, third, fourth and fifth states, the action of the robot 1 according to the first, second, third, fourth and fifth action modes is inhibited (FIG. 3/S260 - - - YES, S360). Namely, when it is very difficult for the robot 1 to grip the tray $W_1$, the action for gripping the tray $W_1$ can be stopped. Further, it is notified to a human being in the surroundings that it is very difficult to take an action so as to be able to finally grip the tray $W_1$. Thus, it is possible to take a coping measure such as changes of the position and posture of the tray $W_1$ by the human being in the surroundings.

"The first object" as a gripping object of the robot 1 may be also various objects such as documents, tableware, fruit, a telephone set, and the like in addition to the tray $W_1$. Further, "the second object" may be also various objects such as magazines, vegetable, a radio, and the like in addition to the cart $W_2$. Further, the first object $W_1$ may be gripped in a state in which the first object (tray) $W_1$ is placed on the second object (cart) $W_2$, and the first object $W_1$ may be also gripped in a state in which the second object $W_2$ exists separately from the first object $W_1$. Further, the first object $W_1$ may be also gripped in a state in which no second object $W_2$ exists around the first object $W_1$.

The robot 1 moves by the movement of the plurality of legs 14. However, when the robot 1 has a wheel, the robot 1 may also move by rotating this wheel or the like.

It is judged whether the second state and the third state are competed or not. When the judging result is affirmative, the action mode is selected by cost comparison (see FIG. 3/S220, S222, S224). As another embodiment, this judgment (see FIG. 3/S222) and the cost comparison (see FIG. 3/S224) may be omitted and the second action mode may be always preferentially selected in comparison with the third action mode. Further, the third action mode may be also always preferentially selected in comparison with the second action mode (before-after exchange of S220 and S230 in FIG. 3).

Further, in a situation in which there is a propensity for mobility or movement easiness of each of the first object $W_1$ and the second object $W_2$ on which the first object $W_1$ is placed, the action of the robot 1 may be also controlled by considering this propensity. Namely, "a first difficult direction" in which the mobility of the first object $W_1$ is less than a first threshold value, and "a first easy direction" in which the mobility of the first object $W_1$ is the first threshold value or more are recognized by the first processing section 210. Further, "a second difficult direction" in which the mobility of the second object $W_2$ is less than a second threshold value, and "a second easy direction" in which the mobility of the second object $W_2$ is the second threshold value or more are recognized by the first processing section 210. Further, it is judged by the second processing section 220 whether or not the robot 1 is in the first state on the basis of the first action mode in which force is applied from the hand 13 to the first object $W_1$ in the first difficult direction, the second difficult direction or an overlapping direction of the first difficult direction and the second difficult direction in gripping the first object $W_1$. Further, it is judged by the second processing section 220 whether or not the robot 1 is in the second state on the basis of the second action mode in which force is applied from the hand 13 to the first object $W_1$ in the first easy direction, the second easy direction or an overlapping direction of the first easy direction and the second easy direction in changing the relative position or the like of the first object $W_1$ using the hand 13.

In accordance with the robot 1 of this construction, when it is judged that the robot 1 is in the first state, the first object $W_1$ can be gripped while the force in the first difficult direction, the second difficult direction and the overlapping direction of the first difficult direction and the second difficult direction is applied to the first object $W_1$ by the hand 13. Therefore, when the robot 1 acts in accordance with the first action mode to grip the first object $W_1$, a situation in which the relative position or the like of the first object $W_1$ is greatly changed to a degree unable to grip the first object $W_1$ on the spot by means of the robot 1 by the change of the position or posture of each of the first object $W_1$ and the second object $W_2$, is avoided.

Further, when it is judged that the robot 1 is in the second state, the position or the like of the first object $W_1$ can be adjusted while the force in the first easy direction, the second easy direction or the overlapping direction of the first easy direction and the second easy direction is applied to the first object $W_1$ by the hand 13. Therefore, the position or posture of each of the first object $W_1$ and the second object $W_2$ is easily changed by acting the robot 1 in accordance with the second action mode. As a result, the relative position or the like of the first object $W_1$ can be easily adjusted.

Further, the operation of the robot 1 may be also stopped if the first processing section 210 judges whether the gripping of the first object $W_1$ is successful or not on the basis of the output of the six-axis force sensor 106 arranged in the hand 13, and the third processing section 230 judges that the gripping of the first object $W_1$ is unsuccessful by the first processing section 210. Thus, for example, it is possible to have a situation change able to grip the first object $W_1$ by the robot 1. Further, it is possible to avoid a situation in which energy such as electric power or the like for moving the robot 1 to grip the first object $W_1$ is uselessly consumed.

What is claimed is:
1. A robot comprising a base body, an arm extended from the base body, and a hand arranged in a tip portion of the arm, and further comprising a control system for controlling an action of the robot;
  wherein the control system has a first processing element, a second processing element and a third processing element;
  the first processing element recognizes a relative position and a relative posture of a first object with the robot as a reference;
  the second processing element judges whether or not the robot is in a first state wherein the robot is able to act in accordance with a first action mode on the basis of a recognition result of the first processing element; wherein the first action mode is an action mode gripping the first object by the hand according to a first action element of moving at least one of the arm and the hand on the spot without moving the robot; and
  the third processing element controls the action of the robot in accordance with the first action mode subject to a judgment of the second processing element that the robot is in the first state; and the third processing element controls the action of the robot in accordance with an action mode different from the first action mode so as to change one or both of the relative position and the relative posture of the first object subject to a judgment of the second processing element that the robot is not in the first state.

2. The robot according to claim 1, wherein
the second processing element further judges whether or not the robot is in a second state wherein the robot is able to act in accordance with a second action mode on the basis of the recognition result of the first processing element; and the second action mode is an action mode for changing the robot from the second state to the first state as a result of changing one or both of the relative position and the relative posture of the first object by the hand according to the first action element; and
the third processing element controls the action of the robot in accordance with the second action mode subject to a judgment of the second processing element that the robot is in the second state.

3. The robot according to claim 2, wherein
the first processing element recognizes an penetration prohibitive area in a situation of that the penetration prohibitive area of the robot exists;
the second processing element further judges whether or not the robot is in a third state wherein the robot is able to act in accordance with a third action mode on the basis of the recognition result of the first processing element, and the third action mode is an action mode for changing the robot from the third state to the first state as a result of changing one or both of the relative position and the relative posture of the first object according to a second action element for moving the robot; and
the third processing element controls the action of the robot in accordance with the third action mode subject to a judgment of the second processing element that the robot is in the third state.

4. The robot according to claim 3, wherein
the second processing element further judges whether or not the robot is in a fourth state wherein the robot is able to act in accordance with a fourth action mode on the basis of the recognition result of the first processing element; and the fourth action mode is an action mode for changing the robot from the fourth state to the second state as a result of changing one or both of the relative position and the relative posture of the first object according to the second action element; and
the third processing element controls the action of the robot in accordance with the fourth action mode subject to a judgment of the second processing element that the robot is in the fourth state.

5. The robot according to claim 4, wherein
the second processing element further judges whether or not the robot is in a fifth state wherein the robot is able to act in accordance with a fifth action mode on the basis of the recognition result of the first processing element; and the fifth action mode is an action mode for changing the robot from the fifth state to the third or fourth state as a result of changing one or both of the relative position and the relative posture of the first object according to the second action element and the first action element subsequent to the second action element; and
the third processing element controls the action of the robot in accordance with the fifth action mode subject to a judgment of the second processing element that the robot is in the fifth state.

6. The robot according to claim 5, wherein
the second processing element judges whether or not the robot is in a state wherein the robot is unable to be changed to one of the first, second, third, fourth and fifth states on the basis of the recognition result of the first processing element; and the third processing element inhibits the action of the robot according to the first, second, third, fourth and fifth action modes subject to a judgment of the second processing element that the robot is in the state.

7. The robot according to claim 6, wherein
the third processing element externally notifies that the robot is in the state when it is judged that the robot is in the above state.

8. The robot according to claim 5, wherein
the second processing element judges whether or not the robot is in the fifth state by judging whether or not a third advancement condition is satisfied;
the third advancement condition is a condition in which all portions of the first and second reference areas are included in the penetration prohibitive area, and at least one portion of a third reference area is projected out of the penetration prohibitive area; and
the first reference area is an area in which the robot can grip the first object by the hand according to the first action element when the robot exists in the first reference area; the second reference area is an area able to change the robot from the second state to the first state as a result in which the robot changes one or both of the relative position and the relative posture of the first object by the hand according to the first action element when the robot exists in the second reference area; and the third reference area is an area able to change the robot from the fifth state to the third state or the fourth state as a result in which the robot changes one or both of the relative position and the relative posture of the first object by the hand according to the first action element when the robot exists in the third reference area.

9. The robot according to claim 8, wherein
the first processing element further recognizes a relative position and a relative posture of a second object with the robot as a reference in a situation in which the first object is placed on the second object, and a direction able to make the hand approach the first object is limited by a specific portion of the second object; and
the third processing element recognizes a reference shade area constituting a shade of the specific portion of the second object seen from the first object on the basis of the recognition result of the first processing element, and judges whether or not the third advancement condition is satisfied on the basis of the first, second and third reference areas with an overlapping area with the reference shade area removed therefrom.

10. The robot according to claim 4, wherein
the second processing element judges whether or not the robot is in the fourth state by judging whether or not a second advancement condition is satisfied on the basis of the recognition result of the first processing element;
the second advancement condition is a condition in which the entire first reference area is included in the penetration prohibitive area, and at least one portion of a second reference area is projected out of the penetration prohibitive area; and
the first reference area is an area in which the robot can grip the first object by the hand according to the first action element when the robot exists in the first reference area; and the second reference area is an area able to change the robot from the second state to the first state as a result in which the robot changes one or both of the relative position and the relative posture of the first object by the hand according to the first action element when the robot exists in the second reference area.

11. The robot according to claim 10, wherein
the first processing element further recognizes a relative position and a relative posture of a second object with the robot as a reference in a situation in which the first object is placed on the second object, and a direction able to make the hand approach the first object is limited by a specific portion of the second object; and
the second processing element recognizes a reference shade area constituting a shade of the specific portion of the second object seen from the first object on the basis of the recognition result of the first processing element, and judges whether or not the second advancement condition is satisfied on the basis of the first and second reference areas with an overlapping area with the reference shade area removed therefrom.

12. The robot according to claim 3, wherein
the second processing element selects the action mode in view of saving of one or both of time and energy required to change the robot to the first state among the second and third action modes when it is judged that the robot is in both the second and third states; and
the third processing element controls the action of the robot in accordance with an action plan selected by the second processing element among the second and third action modes.

13. The robot according to claim 12, wherein
the action of the robot is controlled in accordance with the third action mode subject to a judgment of the second processing element that the robot is not in the second state and is in the third state.

14. The robot according to claim 3, wherein
the first processing element recognizes an area surrounding a second object as the penetration prohibitive area in a situation in which the first object is placed on the second object.

15. The robot according to claim 3, wherein
the second processing element judges whether or not the robot is in the third state by judging whether or not a first advancement condition is satisfied on the basis of the recognition result of the first processing element;
the first advancement condition is a condition in which at least one portion of a first reference area is projected out of the penetration prohibitive area; and
the first reference area is an area in which the robot can grip the first object by the hand according to the first action element when the robot exists in the first reference area.

16. The robot according to claim 15, wherein
the first processing element further recognizes a relative position and a relative posture of a second object with the robot as a reference in a situation in which the first object is placed on the second object, and a direction able to make the hand approach the first object is limited by a specific portion of the second object; and
the second processing element recognizes a reference shade area constituting a shade of the specific portion of the second object seen from the first object on the basis of the recognition result of the first processing element, and judges whether or not the first advancement condition is satisfied on the basis of the first reference area with an overlapping area with the reference shade area removed therefrom.

17. The robot according to claim 2, wherein
the second processing element judges whether or not the robot is in the second state by judging whether or not the first object is included in a second operation area on the basis of the recognition result of the first processing element;
the second operation area is an area in which its shape and width are changed in accordance with the relative posture of the first object, and the robot can move the first object from the second operation area to the first operation area as a result of changing one or both of the relative position and the relative posture of the first object by the hand according to the first action element since the first object exists in the second operation area; and
the first operation area is an area in which its shape and width are changed in accordance with the relative posture of the first object, and the robot can grip the first object by the hand according to the first action element when the first object exists in the first operation area.

18. The robot according to claim 17, wherein
the first processing element further recognizes a relative position and a relative posture of the second object with the robot as a reference in a situation in which the first object is placed on a second object, and a direction able to make the hand approach the first object is limited by a specific portion of the second object; and
the second processing element recognizes an operation shade area constituting a shade of the specific portion of the second object seen from the robot on the basis of the recognition result of the first processing element, and judges whether or not the robot is in the second state on the basis of the first and second operation areas with an overlapping area with the operation shade area removed therefrom.

19. The robot according to claim 2, wherein
the first processing element further recognizes a first easy direction in which mobility of the first object is a threshold value or more in a situation in which there is a propensity for the mobility of the first object; and
the second processing element judges whether or not the robot is in the second state on the basis of the second action mode in which force in the first easy direction is applied from the hand to the first object when one or both of the relative position and the relative posture of the first object are changed by the hand by operating the arm and the hand on the basis of the recognition result of the first processing element.

20. The robot according to claim 2, wherein
the first processing element further recognizes a second easy direction in which mobility of the second object is a threshold value or more in a situation in which there is a propensity for the mobility of the second object; and
the second processing element judges whether or not the robot is in the second state on the basis of the second action mode in which force in the second easy direction is applied from the hand to the first object when one or both of the relative position and the relative posture of the first object are changed by the hand by operating the arm and the hand on the basis of the recognition result of the first processing element.

21. The robot according to claim 1, wherein
the second processing element judges whether or not the robot is in the first state by judging whether or not the first object is included in a first operation area on the basis of the recognition result of the first processing element; and
the first operation area is an area in which its shape and width are changed in accordance with the relative posture of the first object, and the robot can grip the first object by the hand according to the first action element when the first object exists in the first operation area.

22. The robot according to claim 21, wherein
the first processing element further recognizes a relative position and a relative posture of a second object with the robot as a reference in a situation in which the first object is placed on the second object, and in which a direction able to make the hand approach the first object is limited by a specific portion of the second object; and
the second processing element recognizes an operation shade area constituting a shade of the specific portion of the second object seen from the robot on the basis of the recognition result of the first processing element, and judges whether or not the robot is in the first state on the basis of the first operation area with an overlapping area with the operation shade area removed therefrom.

23. The robot according to claim 1, wherein
the first processing element further recognizes a first difficult direction in which mobility of the first object is less than a threshold value in a situation in which there is a propensity for the mobility of the first object; and
the second processing element judges whether or not the robot is in the first state on the basis of the first action mode in which force in the first difficult direction is applied from the hand to the first object in gripping the first object on the basis of the recognition result of the first processing element.

24. The robot according to claim 1, wherein
the first processing element further recognizes a second difficult direction in which mobility of the second object is less than a threshold value in a situation in which the first object is placed on the second object and there is a propensity for the mobility of the second object; and
the second processing element judges whether or not the robot is in the first state on the basis of the first action mode in which force in the second difficult direction is applied from the hand to the first object in gripping the first object on the basis of the recognition result of the first processing element.

25. The robot according to claim 1, wherein
the first processing element judges whether the gripping of the first object is successful or not; and
the third processing element stops the operation of the robot subject to a judgment of the first processing element that the gripping of the first object is unsuccessful.

26. The robot according to claim 1, wherein
the robot is a legged mobile robot having a plurality of legs extended from the base body.

27. A method for controlling the action of a robot comprising a base body, an arm extended from the base body, and a hand arranged in a tip portion of the arm;
wherein first processing, second processing and third processing are executed;
a relative position and a relative posture of a first object with the robot as a reference are recognized in the first processing;
it is judged in the second processing whether or not the robot is in a first state wherein the robot is able to act in accordance with a first action mode on the basis of a recognition result in the first processing; and the first action mode is an action mode for gripping the first object by the hand according to a first action element moving one or both of the arm and the hand on the spot without moving the robot; and
the action of the robot is controlled in the third processing in accordance with the first action mode subject to a judgment of the second processing that the robot is in the first state; and the action of the robot is controlled in the third processing in accordance with an action mode different from the first action mode so as to change one or both of the relative position and the relative posture of the first object subject to a judgment of the second processing that no robot is in the first state.

28. The method according to claim 27, wherein
it is further judged in the second processing whether or not the robot is in a second state wherein the robot is able to act in accordance with a second action mode on the basis of the recognition result in the first processing; and the second action mode is an action mode for changing the robot from the second state to the first state as a result of changing one or both of the relative position and the relative posture of the first object by the hand according to the first action element; and
the action of the robot is controlled in the third processing in accordance with the second action mode subject to a judgment of the second processing that the robot is in the second state.

29. The method according to claim 28, wherein
an penetration prohibitive area is recognized in the first processing in a situation in which the penetration prohibitive area of the robot exists;
it is further judged in the second processing whether or not the robot is in a third state wherein the robot is able to act in accordance with a third action mode on the basis of the recognition result in the first processing; and the third action mode is an action mode for changing the robot from the third state to the first state as a result of changing one or both of the relative position and the relative posture of the first object according to a second action element for moving the robot; and
the action of the robot is controlled in the third processing in accordance with the third action mode subject to a judgment of the second processing that the robot is in the third state.

30. The method according to claim 29, wherein
it is further judged in the second processing whether or not the robot is in a fourth state wherein the robot is able to act in accordance with a fourth action mode on the basis of the recognition result in the first processing; and the fourth action mode is an action mode for changing the robot from the fourth state to the second state as a result of changing one or both of the relative position and the relative posture of the first object according to the second action element; and
the action of the robot is controlled in the third processing in accordance with the fourth action mode subject to a judgment of the second processing that the robot is in the fourth state.

31. The method according to claim 30, wherein
it is further judged in the second processing whether or not the robot is in a fifth state wherein the robot is able to act in accordance with a fifth action mode on the basis of the recognition result in the first processing; and the fifth action mode is an action mode for changing the robot from the fifth state to the third state or the fourth state as a result of changing one or both of the relative position and the relative posture of the first object according to the second action element and the first action element subsequent to the second action element; and
the action of the robot is controlled in the third processing in accordance with the fifth action mode subject to a judgment of the second processing that the robot is in the fifth state.

32. A program in which a computer mounted to a robot comprising a base body, an arm extended from the base body, and a hand arranged in a tip portion of the arm functions as a control system for controlling an action of the robot such that:
  wherein the control system has a first processing element, a second processing element and a third processing element;
  the first processing element recognizes a relative position and a relative posture of a first object with the robot as a reference;
  the second processing element judges whether or not the robot is in a first state wherein the robot is able to act in accordance with a first action mode on the basis of a recognition result of the first processing element; and the first action mode is an action mode gripping the first object by the hand according to a first action element moving at least one of the arm and the hand on the spot without moving the robot; and
  the third processing element controls the action of the robot in accordance with the first action mode subject to a judgment of the second processing element that the robot is in the first state; and the third processing element controls the action of the robot in accordance with an action mode different from the first action mode so as to change one or both of the relative position and the relative posture of the first object subject to a judgment of the second processing element that no robot is in the first state.

33. The program according to claim 32, wherein the computer fulfills the function such that
  the second processing element further judges whether or not the robot is in a second state wherein the robot is able to act in accordance with a second action mode on the basis of the recognition result of the first processing element; and the second action mode is an action mode for changing the robot from the second state to the first state as a result of changing one or both of the relative position and the relative posture of the first object by the hand according to the first action element; and
  the third processing element controls the action of the robot in accordance with the second action mode subject to a judgment of the second processing element that the robot is in the second state.

34. The program according to claim 33, wherein the computer fulfills the function such that
  the first processing element recognizes an penetration prohibitive area in a situation in which the penetration prohibitive area of the robot exists;

the second processing element further judges whether or not the robot is in a third state wherein the robot is able to act in accordance with a third action mode on the basis of the recognition result of the first processing element; and the third action mode is an action mode for changing the robot from the third state to the first state as a result of changing one or both of the relative position and the relative posture of the first object according to a second action element for moving the robot; and
  the third processing element controls the action of the robot in accordance with the third action mode subject to a judgment of the second processing element that the robot is in the third state.

35. The program according to claim 34, wherein the computer fulfills the function such that
  the second processing element further judges whether or not the robot is in a fourth state wherein the robot is able to act in accordance with a fourth action mode on the basis of the recognition result of the first processing element; and the fourth action mode is an action mode for changing the robot from the fourth state to the second state as a result of changing one or both of the relative position and the relative posture of the first object according to the second action element; and
  the third processing element controls the action of the robot in accordance with the fourth action mode subject to a judgment of the second processing element that the robot is in the fourth state.

36. The program according to claim 35, wherein the computer fulfills the function such that
  the second processing element further judges whether or not the robot is in a fifth state wherein the robot is able to act in accordance with a fifth action mode on the basis of the recognition result of the first processing element; and the fifth action mode is an action mode for changing the robot from the fifth state to the third or fourth state as a result of changing one or both of the relative position and the relative posture of the first object according to the second action element and the first action element subsequent to the second action element; and
  the third processing element controls the action of the robot in accordance with the fifth action mode subject to a judgment of the second processing element that the robot is in the fifth state.

* * * * *